(12) United States Patent
Fairhurst et al.

(10) Patent No.: US 10,686,714 B2
(45) Date of Patent: Jun. 16, 2020

(54) TRAFFIC MANAGEMENT FOR HIGH-BANDWIDTH SWITCHING

(71) Applicant: Avago Technologies General IP (Singapore) Pte. Ltd., Singapore (SG)

(72) Inventors: Mark Fairhurst, Didsbury (GB); Eugene N. Opsasnick, San Jose, CA (US); Michael H. Lau, San Jose, CA (US); Ari Aravinthan, San Jose, CA (US); Manoj Lakshmygopalakrishnan, San Jose, CA (US); Ankit Sajjan Kumar Bansal, San Jose, CA (US); Yehuda Avidan, San Jose, CA (US); Noam Halevy, Yakum (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 15/965,828

(22) Filed: Apr. 27, 2018

(65) Prior Publication Data
US 2019/0334828 A1    Oct. 31, 2019

(51) Int. Cl.
*H04L 12/863* (2013.01)
(52) U.S. Cl.
CPC ..................... *H04L 47/50* (2013.01)
(58) Field of Classification Search
CPC ........................................... H04L 47/50
See application file for complete search history.

(56) References Cited

U.S. PATENT DOCUMENTS

| | | | |
|---|---|---|---|
| 7,039,046 B1* | 5/2006 | Simons | H04L 49/15 370/218 |
| 2002/0083173 A1* | 6/2002 | Musoll | G06F 9/546 709/225 |
| 2008/0120450 A1* | 5/2008 | Mott | G06F 13/364 710/113 |
| 2012/0023295 A1* | 1/2012 | Nemawarkar | H04L 47/621 711/130 |
| 2014/0098818 A1 | 4/2014 | Matthews | |
| 2014/0160935 A1* | 6/2014 | Zecharia | H04L 47/34 370/235 |
| 2016/0127267 A1* | 5/2016 | Kumar | H04L 49/252 370/400 |
| 2016/0226797 A1 | 8/2016 | Aravinthan | |
| 2017/0063609 A1 | 3/2017 | Philip | |

FOREIGN PATENT DOCUMENTS

WO    WO 2007/003370    1/2007

OTHER PUBLICATIONS

Extended European Search Report from European Patent Application No. 19171403.9, dated Jul. 23, 2019, 8 pages.

* cited by examiner

*Primary Examiner* — Jason E Mattis
(74) *Attorney, Agent, or Firm* — Morgan, Lewis & Bockius LLP

(57) ABSTRACT

In the subject system for a network switch may receive one or more packets via a set of input ports. The network switch may write the one or more packets into an ingress buffer of an ingress tile shared by the set of input ports. The network switch may read the one or more packets from the ingress buffer according to a schedule by a scheduler. The network switch may forward the read one or more packets to a plurality of output ports.

20 Claims, 21 Drawing Sheets

TRAFFIC MANAGEMENT FOR HIGH-BANDWIDTH SWITCHING

TECHNICAL FIELD

The present description relates generally to a hybrid-shared traffic managing system capable of performing a switching function in a network switch.

BACKGROUND

A network switch may be used to connect devices so that the devices may communicate with each other. The network switch includes a traffic managing system to handle incoming traffic of data received by the network switch and outgoing traffic transmitted by the network switch. The network switch may further include buffers used by the traffic managing system for managing data traffic. The input ports and the output ports of the network switch may be arranged differently for different purposes. For example, an operating clock frequency may be scaled to run faster. Further, various features such as a cut through feature may be implemented to enhance the network switch performance.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

Figure 1:
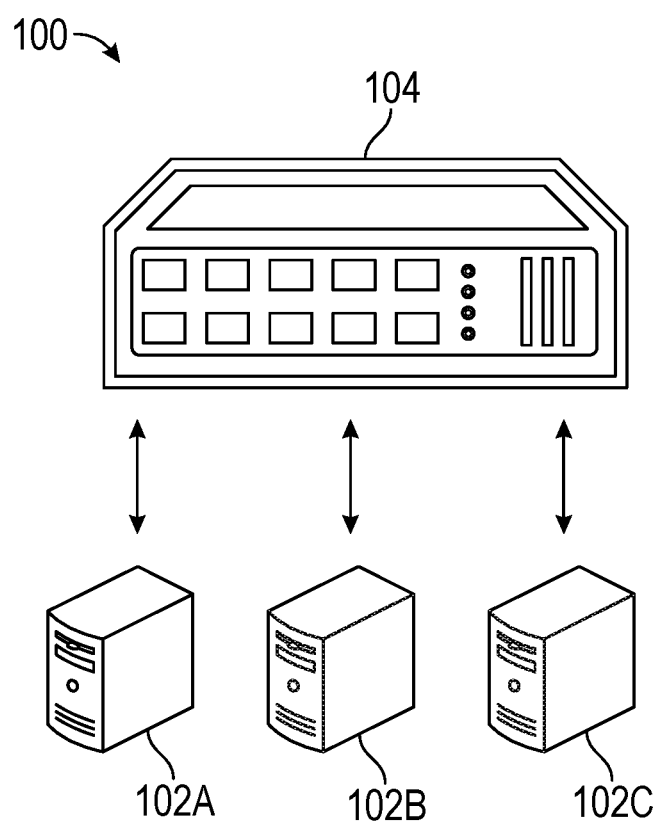
FIG. 1 illustrates an example network environment in which traffic flow management within a network switch may be implemented in accordance with one or more implementations.

FIG. 1 illustrates an example network environment 100 in which traffic flow management within a network switch may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C connected via a network switch 104. The electronic devices 102A-C may be connected to the network switch 104, such that the electronic devices 102A-C may be able to communicate with each other via the network switch 104. The electronic devices 102A-C may be connected to the network switch 104 via wire (e.g., Ethernet cable) or wirelessly. The network switch 104, may be, and/or may include all or part of, the network switch discussed below with respect to FIG. 5 and/or the electronic system discussed below with respect to FIG. 21. The electronic devices 102A-C are presented as examples, and in other implementations, other devices may be substituted for one or more of the electronic devices 102A-C.

For example, the electronic devices 102A-C may be computing devices such as laptop computers, desktop computers, servers, peripheral devices (e.g., printers, digital cameras), mobile devices (e.g., mobile phone, tablet), stationary devices (e.g. set-top-boxes), or other appropriate devices capable of communication via a network. In FIG. 1, by way of example, the electronic devices 102A-C are depicted as network servers. The electronic devices 102A-C may also be network devices, such as other network switches, and the like.

The network switch 104 may implement the subject traffic flow management within a network switch. An example network switch 104 implementing the subject system is discussed further below with respect to FIG. 5, and example processes of the network switch 104 implementing the subject system are discussed further below with respect to FIG. 21.

The network switch 104 may implement a hybrid-shared traffic manager architecture in which a traffic manager includes a main packet payload buffer memory. The traffic manager performs a central main switching function that involves moving packet data received from input ports to correct output port(s). Main functions of the traffic manager may include admission control, queueing, and scheduling. The admission control involves determining whether a packet can be admitted into the packet buffer or discarded based on buffer fullness and fair sharing between ports and queues. In queueing, packets that are admitted into the packet buffer are linked together into output queues. For example, each output port may have multiple separate logical queues (e.g., 8 separate logical queues). Packets are enqueued upon arrival into the traffic manager, and are dequeued after being scheduled for departure to its output port. In scheduling, a port with backlogged packet data in multiple queues may select one queue at a time to dequeue a packet, such that backlogged packet data may be transmitted to the output port. This may be done based on a programmable set of Quality of Service (QoS) parameters.

The network switch 104 may include a switching chip that may be generally configured to scale the operating clock frequency to run faster when the network switch 104 includes more ports and/or faster interfaces. Such configurations may be made while using a shared-buffer architecture for the traffic manager, where input ports and output ports have equal access to the entire payload memory, and the control structures of the traffic manager operate on one or two packets (or part of a packet) in each clock cycle.

However, recent switching chips are not able to scale the operating clock frequency to achieve a speed beyond which the transistors operate, and thus chip's clock frequency may not allow faster operation. Other constraints such as total device power may also limit the maximum clock operating frequency. Therefore, if new switching chips are not configured to increase the chip's clock frequency, the chips may need to support more and/or faster ports, which makes it difficult to use the existing shared-buffer architecture for newer and larger generations of switch chips.

An alternative switch architecture may be used to support more and/or faster ports without scaling the operating clock frequency to a very high bandwidth. For example, the alternative switch architecture may be an input-output buffered architecture, where the payload memory is divided into several smaller segments, each of which can handle a fraction of the total switch bandwidth. Each part can then operate at a lower clock frequency than would be required to switch the entire bandwidth. This architecture may be capable of scaling the switch bandwidth to a much higher bandwidth than the shared-buffer architecture. However, each input port or output port has access to a fraction of the total payload memory. For requirements with limited total payload memory, a memory segment may be too small to allow efficient sharing of the memory space.

In the shared-buffer architecture, a limited number of packets (e.g., one or two packets) may be processed at a time.

Figure 2:
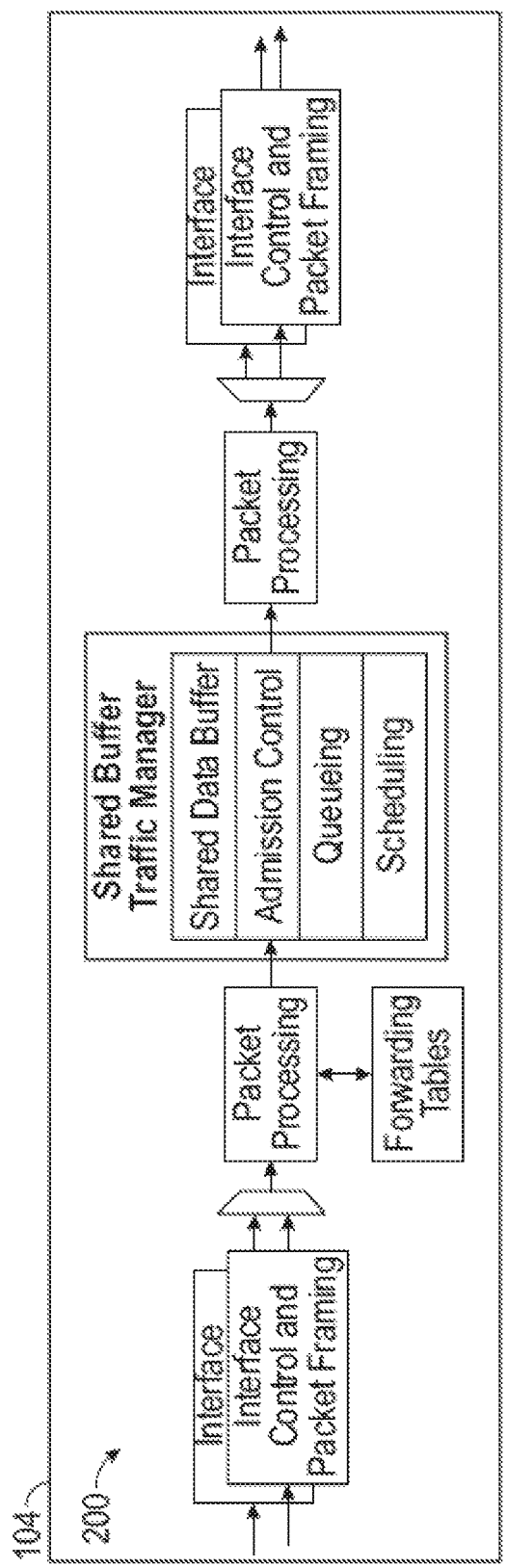
FIG. 2 is an example diagram illustrating a shared-buffer architecture for a network switch that processes a single packet per cycle.

FIG. 2 is an example diagram 200 illustrating a shared-buffer architecture for a network switch (e.g., the network switch 104) that processes a single packet per cycle. The traffic manager may process a single packet or a single packet segment per cycle and the shared-buffer architecture may include a shared data buffer, an admission control component, a queueing component, and a scheduling component. A packet payload buffer (e.g., the shared data buffer) may be implemented with single-port memories by utilizing multiple physical banks within the total buffer. When a packet is scheduled to be transmitted, the packet can be located anywhere in the buffer, in any bank. While this packet is being read from one bank, a newly received packet can be written into a different bank of the buffer.

Figure 3:
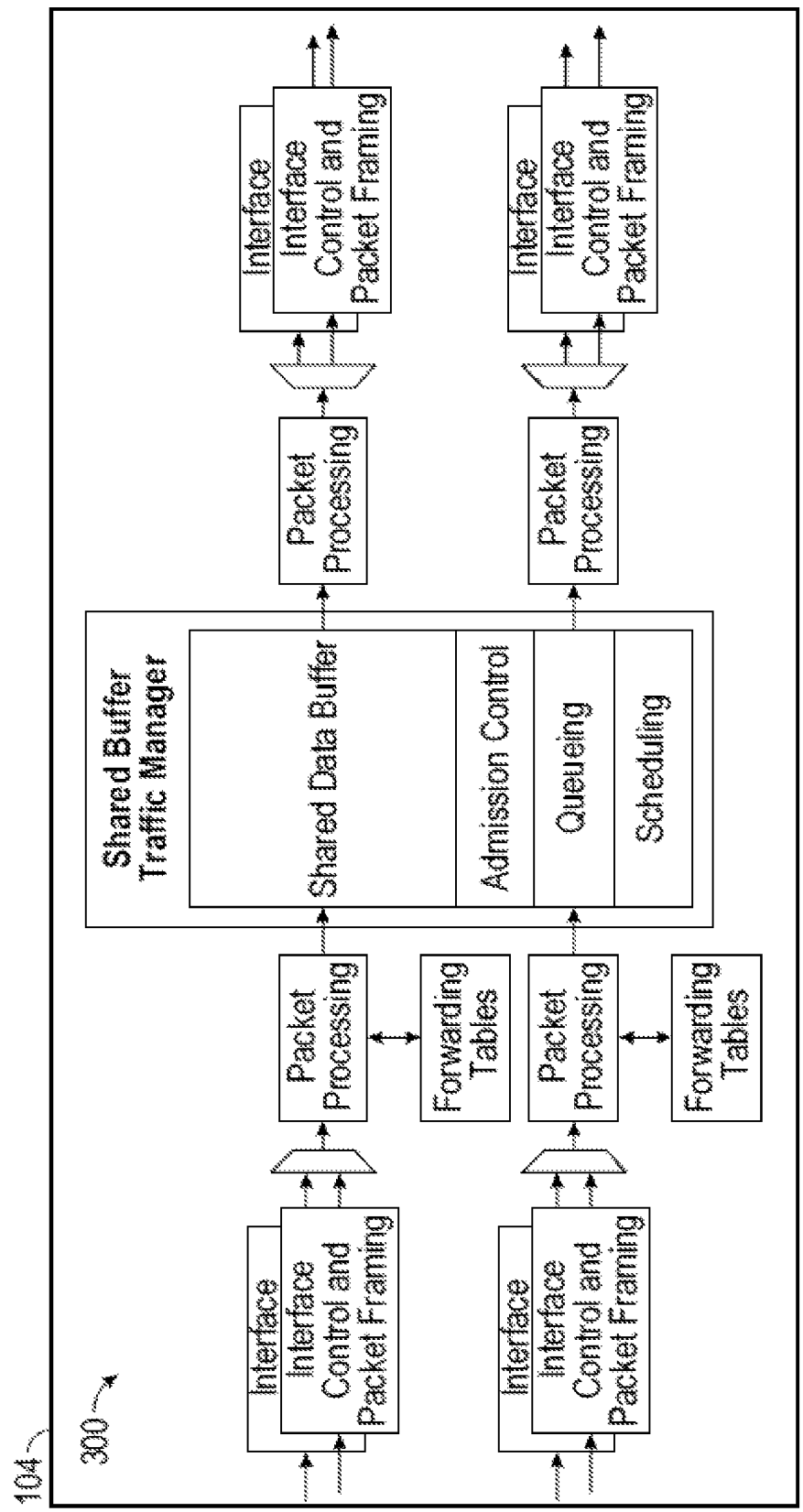
FIG. 3 is an example diagram illustrating a scaled-up shared-buffer architecture for a network switch that processes two packets per cycle.

FIG. 3 is an example diagram 300 illustrating a scaled-up shared-buffer architecture for a network switch (e.g., the network switch 104) that processes two packets per cycle. Each physical bank of the buffer memory implemented in the shared-buffer architecture of FIG. 3 is capable of supporting two random access reads within a single bank because two scheduled packets for transmission may reside in the same bank at the same time. The received packets in the same cycle can always be directed to be written into memory banks other than the ones being read while avoiding collisions with other writes. This type of memory is more expensive (e.g., in terms of area per bit of memory), but may be simple to implement. However, scaling the memory design to support more than two random access reads at a time may become very expensive and may not be a cost-effective approach.

The packet processing in a switch chip that examines each packet and determines an output port to switch the packet to can be parallelized, such that multiple packet processing processes may be performed in parallel. For example, the chip may support a total of 64 100 Gbps interfaces (ports). To keep up with the packet processing requirements of many interfaces (e.g., 4 pipelines each with 32×100 Gbps interfaces), the chip may implement eight separate packet processing elements, where, for example, each of the packet processing elements may support up to 8 100 Gbps by processing 1 packet per clock cycle. The clock frequency of the chip and the number of ports may dictate the number of packet processors that are necessary for the parallel packet processing. As such, the traffic manager in the chip may need to be able to simultaneously handle eight incoming packets or eight cells, where each cell is a portion of a packet. For example, the packets (e.g., 2000 bytes per packet) may be divided into cells (e.g., 128 bytes per cell). The traffic manager may also need to select eight outgoing packets or cells in every cycle where the egress packets are of independent flows.

A single shared-buffer switch may need to be able to write eight separate cells and read eight separate cells every cycle. Handling the write operations in a multi-banked shared memory is easier than handling the multiple read operations. The writing of the cells to the buffer can be handled by directing individual writes to separate banks within the shared memory. However, the eight buffer reads each cycle may collide on common banks because the eight buffer reads are scheduled independently, creating bank conflicts that may not be easily resolved in the shared-buffer architecture.

Another traffic manager architecture is an input-output-buffered traffic manager architecture. The input-output-buffered architecture implements separate ingress buffer elements and egress buffer elements that each support a fraction of the total switch bandwidth. For example, each buffer element may be capable of supporting a single input and output cell. Further, a mesh interconnect may be implemented to provide connections between the ingress buffers and the egress buffers. Typically, each of the ingress buffers and the egress buffers has its own Queueing and scheduling control structures. As a result, the total packet payload memory is divided into several smaller pieces across the ingress buffers and the egress buffers, and thus each input port has access to a fraction of the total buffer. The independent control and limited bandwidth of each element also means that input blocking can occur.

Figure 4:
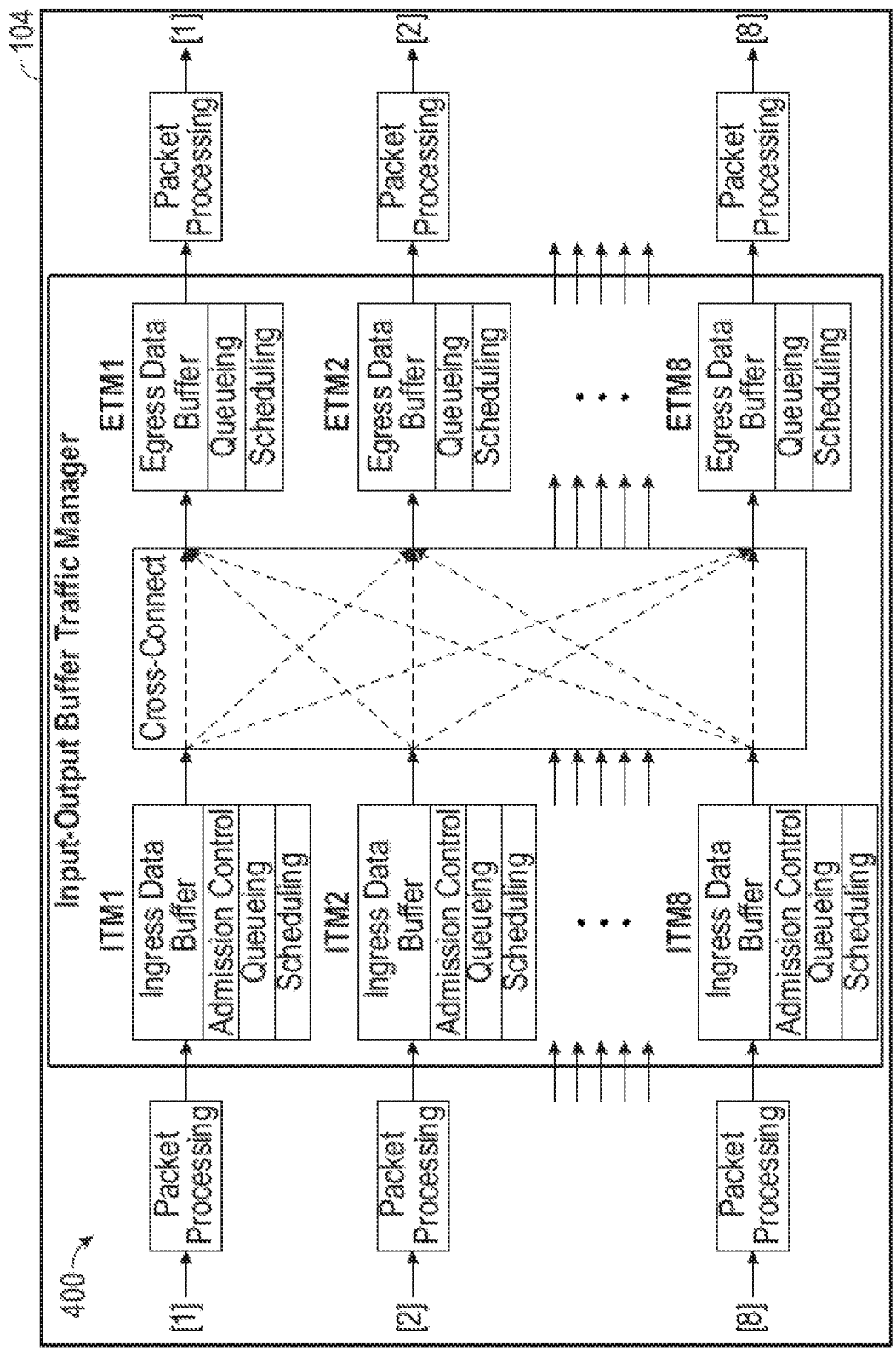
FIG. 4 is an example diagram illustrating an implementation of the input-output-buffered traffic manager for a network switch that is configured to process eight packets per cycle.

FIG. 4 is an example diagram 400 illustrating an implementation of the input-output-buffered traffic manager for a network switch (e.g., the network switch 104) that is configured to process eight packets per cycle. The input-output-buffered traffic manager of FIG. 4 includes 8 ingress traffic managers (ITM) and 8 egress traffic managers (ETM). Each ingress traffic manager includes an ingress buffer, an admission control element, a queueing element, and a scheduling element. Each egress traffic manager includes an egress data buffer, a queueing component, and a scheduling component. Each ingress buffer is configured to support a single input cell and a single output cell. Each egress buffer is configured to support a single input cell and a single output cell. The cross-connect component provides a mesh interconnect between the 8 ingress buffers and 8 egress buffers.

The input-output-buffered architecture may suffer from several shortcomings. For example, each input port or each output port may have access to only a fraction of the total payload memory because the buffer is divided into several smaller portions, where each portion handles a single packet per cycle. As such, the buffering bandwidth-delay product (e.g., the amount of buffering available to any one output port) can be severely limited. Dividing the buffer into smaller portions also means that the control logic that performs admission control and queueing should be replicated at each ingress and egress buffer, which may have a significant impact on the size and the cost of this architecture in a single chip ASIC design and/or a multi-chip ASIC design. The thresholding may be compromised or become more complicated as it is difficult to control the buffer space allocated to a logical queue that has several physical queues (VoQs) each using up space. The scheduling function increases in complexity compared to a shared-buffer architecture as the scheduler has to select from and provide fairness for multiple sources (VoQs) within each logical queue.

The input-output-buffered architecture may also suffer from input blocking due to source congestion that can occur when several output ports associated with different egress buffers all need to transmit packets from a single ingress buffer. The single ingress buffer may not be able to provide enough bandwidth to support all of the output ports at the same time, which may lead to loss in performance due to reduced bandwidth to all affected output ports. Although the input blocking problem may be mitigated by introducing internal speed-up between the ingress buffers and egress buffers, such internal speed-up may have a significant impact on the size and complexity of the Ingress stages, interconnect and output stages, and may affect the clock frequency (power) and area of the chip that may question the feasibility of the chip design.

The subject technology includes a switch traffic manager architecture called a hybrid-shared switch architecture. The hybrid-shared switch architecture combines elements of both the shared-buffer switch architecture and the input-output-buffered switch architectures to be able to scale the total switch bandwidth in a switch to very high levels, while retaining the advantages of a shared buffer switch where all inputs and outputs have access to a high percentage of the switch's payload buffer.

The hybrid-shared switch architecture may utilize a small number of large Ingress Data Buffers to achieve a very high level of buffer sharing among groups of input ports. Each Ingress Data Buffer element (e.g., referred to as an ingress tile or an ITM) may service multiple input ports. For example, if the hybrid-shared switch architecture has two ITMs, each ITM may be configured to service a half of the total switch ports. In some aspects, the hybrid-shared switch architecture may include a single central scheduler that is configured to schedule traffic across all ingress buffers to simultaneously maximize the bandwidth of each input tile and to keep all output ports satisfied. The packets scheduled by the scheduler may be forwarded to multiple egress buffers (EBs). The EBs may be associated with a set of output ports. The packets, once scheduled by the scheduler, do not need to be scheduled again even though there are several small EBs. The scheduled packets may be forwarded through the EBs based on a time of arrival (e.g., on a first-come first-served basis). In one or more implementations, the switch may include a distributed scheduler where destination based schedulers simultaneously pull from ITMs.

Figure 5:
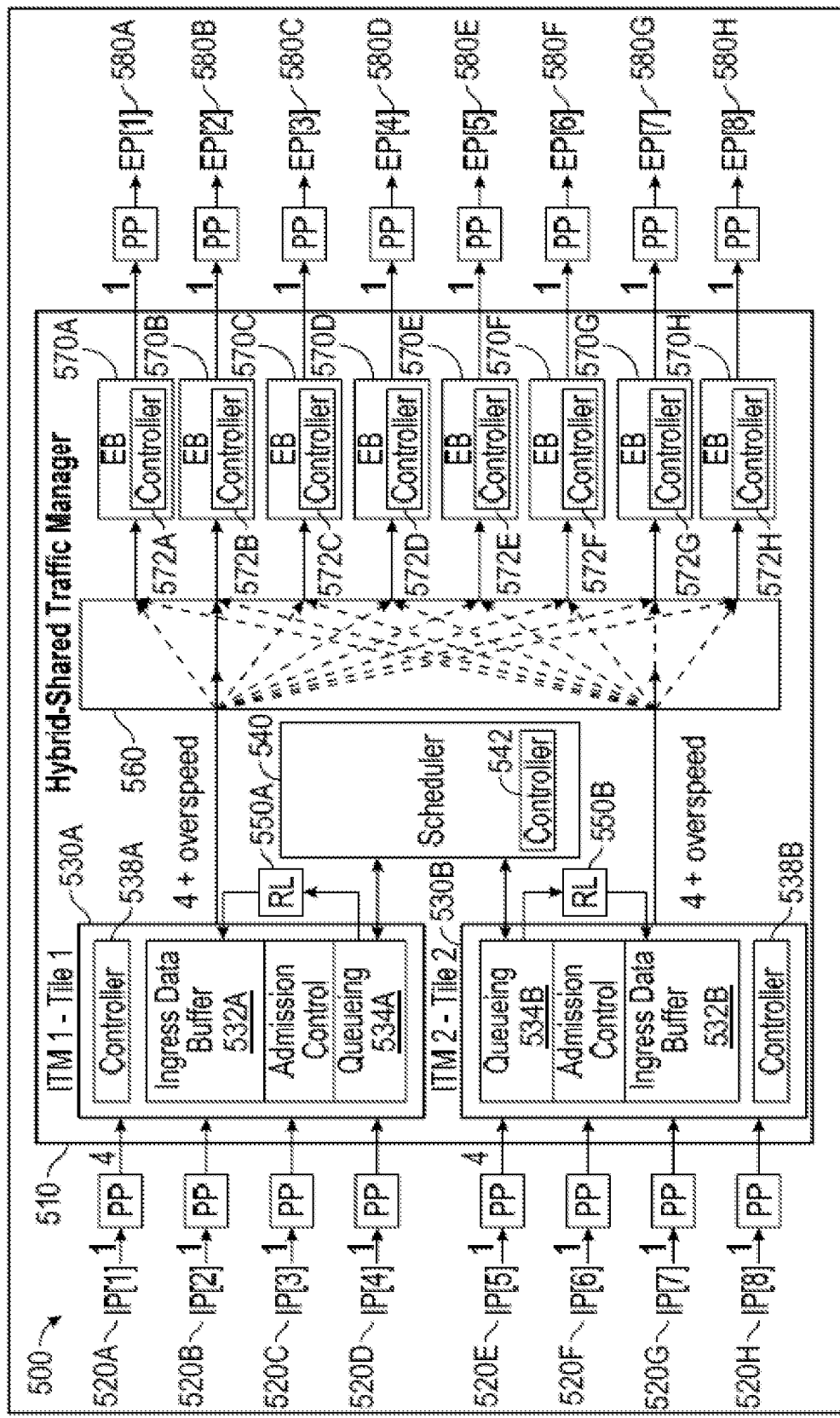
FIG. 5 is an example diagram illustrating a hybrid-shared switch architecture for a network switch, in accordance with one or more implementations.

FIG. 5 is an example diagram 500 illustrating a hybrid-shared switch architecture for a network switch, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 5, the network switch 104 may include a hybrid-shared traffic manager 510, input ports (ingress ports (IPs)) 520A-520H, and output ports (egress ports (EPs)) 580A-580H. The input ports 520A-520H may be coupled to respective ingress pipelines, and the output ports 580A-580H may be coupled to respective egress pipelines. In some aspects, the distinction between the input ports 520A-520H and the output ports 580A-580H may be a logical distinction, and same physical ports may be used for one or more of the input ports 520A-520H and one or more of the output ports 580A-580H. As discussed above, the packets received via the input ports 520A-520H may be divided into cells via packet processing, such that the cells may be stored and queued at the hybrid-shared traffic manager 510.

The example hybrid-shared traffic manager 510 is connected to the input ports 520A-520H and the output ports 580A-580H and includes two ITMs (also referred to as ingress tiles) 530A-B including a first ITM 530A and a second ITM 530B, where each of the ITMs 530A-B is connected to four input ports. Each of the ITMs 530A-B includes an ingress buffer, a queueing component, and an admission control component. Thus, the first ITM 530A includes the ingress buffer 532A and the queueing component 534A, and the second ITM 530B includes the ingress buffer 532B and the queueing component 534B. The ingress buffer 532A and the queueing component 534A of the first ITM 530A are connected to a read launcher 550A. The ingress buffer 532B and the queueing component 534B of the second ITM 530B are connected to the read launcher 550B. Although the read launchers 550A-B in FIG. 5 are illustrated as separate components from the ITMs 530A-B, the read launchers 550A-B may reside in the ITMs 530A-B respectively. The queueing component 534A of the first ITM 530A and the queueing component 534B of the second ITM 530B are connected to a centralized main scheduler 540.

Each of the ITMs 530A and 530B may be controlled by its own controller and/or processor. For example, the first ITM 530A may be controlled by the first ingress controller 538A and the second ITM 530B may be controlled by the second ingress controller 538B. Each of the ITMs 530A and 530B may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices).

The packets from the ingress buffer 532A of the first ITM 530A and the ingress buffer 532B of the second ITM 530B are forwarded to a cross-connect component 560, which provides connectivity between the ingress buffers 532A and 532B of the two ITMs 530A and 530B and the egress buffer (EB) components 570A-570H having respective egress buffers. The EB components 570A-570H are connected to the output ports 580A-580H, respectively.

Each of the EB components 570A-570H may be controlled by its own controller and/or processor. For example, the EB components 570A-570H may be controlled by respective egress controllers 572A-572H. In one or more implementations, the EB components 570A-570H may be first-in first-out buffers that store data (e.g. cells, packets, etc.) received from the ITMs 530A-B. In one or more implementations, one or more EB components 570A-570H may be connected to two or more packet processors. The data may then be read out for transmission by one or more egress packet processors. Each of the EB components 570A-570H may be implemented in hardware (e.g., an ASIC, an FPGA, a PLD, a controller, a state machine, gated logic, discrete hardware components, or any other suitable devices), software, and/or a combination of both.

Each of the ingress buffers 532A-B may be partitioned into multiple memory banks. For example, in some aspects, the bandwidth of the memory banks in each of the ITMs 530A-B may be used to support higher total read and write bandwidth than that provided by a single memory. Write operations may be forwarded to memory banks in such a way to avoid read operations and/or other write operations.

The single centralized main scheduler 540 in the hybrid-shared traffic manager 510 may schedule packets based on quality of service (QoS) requirements and/or bandwidth availability across the ingress buffers 532A-B. Thus, the main scheduler 540 may issue read requests to read cells from the ingress buffers 532A-B of the ITMs 530A-B based on QoS requirements and/or bandwidth availability across the ingress buffers 532A-B of the ITMs 530A-B. For example, if eight cells are set to be transferred to the egress pipelines per clock cycle, an average of eight cells may be scheduled and read from the ingress buffers every cycle to maintain bandwidth to the output ports. The main scheduler 540 may be controlled by its own scheduling controller 542. The main scheduler 540 may be implemented in software (e.g., subroutines and code), hardware (e.g., an ASIC, an FPGA, a PLD, a controller, a state machine, gated logic, discrete hardware components, or any other suitable devices), software, and/or a combination of both.

If the main scheduler 540 schedules reading multiple cells at the same time from the same memory location, colliding read requests to the ingress buffers may result. The collision may occur when two or more read requests read cells from the same memory bank of the ingress buffer (e.g., ingress buffer 532A or 532B) in a same cycle. For example, the collision may occur because the scheduling is based on QoS parameters and may require any queued packet at any time to be sent to a proper output port. This results in an uncontrolled selection of read address banks (memory read requests) to the buffers. Therefore, it may not be possible to guarantee that the main scheduler 540 will schedule non-colliding reads. Such collisions should be avoided to prevent stalling output scheduling and dequeue operations.

In some aspects, to compensate for these scheduling conflicts, the architecture may allow for memory read requests to be delayed and thus to occur out-of-order. In one or more implementations, the cell read requests from the main scheduler 540 may be forwarded to a corresponding read launcher (e.g., read launcher 550A or 550B), which may be a logical block and/or a dedicated hardware component. The read launcher 550A or 550B resolves the memory bank conflicts and can issue a maximum number of non-colliding reads per clock cycle to each ITM's data buffer. One or more read requests of the read requests that collide with each other are held by a corresponding read launcher (e.g., the read launcher 550A or 550B) until later cycles when the one or more read requests can be issued with no collisions. In one example, if a first and second read requests collide with each other, the first read request may be issued during a next cycle and the second read request may be issued during a subsequent cycle after the next cycle. In another example, if a first and second read requests collide with each other, the first read request may be issued during a current cycle and the second read request may be issued during a next cycle. In one or more implementations, the read requests with collisions may be held in temporary request FIFOs (e.g., associated with the read launcher 550A or 550B), allowing the read requests with collisions to be delayed in the Read Launcher without blocking read requests to non-colliding banks. This allows the main scheduler 540 to continue scheduling cells as needed keep up with the output port bandwidth demands without stalling. Hence, using the read launcher 550A or 550B, the cell read requests may be reordered to avoid collisions. For example, while reordering, older read requests may be prioritized over newer read requests.

The read launcher 550A or 550B allows some newer read requests to be issued before older delayed read requests, thus creating possible "out-of-order" data reads from the buffer. After being read from the ingress buffer, the packets and cells are then put back in order and before being sent out to the final destination by the egress buffers. Further, the architecture may provide read speed-up. For example, an ITM with 4 writes per cycle may support 4+overhead reads per cycle. This read speed-up over the write bandwidth allows for the system to catch-up after any collisions that may occur. The combination of the out-of-order reads and the read speed-up may allow the architecture to maintain full bandwidth to the all output ports of the switch chip.

In one or more implementations, each egress packet processor and the output ports it serves may be supported by a single EB component and/or a EB component may support multiple egress packet processors. For example, the output port 580A and the packet processor serving the output port 580A are supported by the EB component 570A. There are eight EB components 570A-570H in the hybrid-shared switch architecture 500 illustrated in FIG. 5. The EB component may contain a relatively small buffer that re-orders the data from the ingress buffers and feeds each egress packet processor. Because the EB component supports only a single egress packet processor, the EB component may be implemented as a simple buffer structure in one or more implementations.

The ITM's shared buffer may be capable of supporting X incoming cells and X+overspeed outgoing cells per cycle, where the ITM may include the standard admission control and Queueing of a shared-buffer traffic manager. A centralized main scheduler in the hybrid-shared switch architecture may have visibility into all ITMs and can schedule queues based on QoS parameters and ITM availability (e.g., ingress buffer availability). A read launcher is implemented to resolve buffer bank conflicts of multiple scheduled cells (e.g., read collisions) and allows out-of-order buffer reads prevent stalling the main scheduler. Each EB component in the hybrid-shared architecture may be capable of re-ordering data (e.g., to the order of arriving) before forwarding to the egress packet processor (and to output ports).

The hybrid-shared switch architecture is capable of scaling bandwidth higher without the limitations of the shared-buffer and input-output-buffered architectures. The hybrid-shared architecture has close to the same performance of the shared-memory architecture in terms of buffering capacity for each port, but can scale to a much larger total bandwidth. Further, compared to the shared-buffer architecture, the hybrid-shared architecture has a smaller bandwidth requirement on its ingress buffers of the ITMs. This makes the ingress buffer easier to implement with simple single-port memories. The hybrid-shared switch can scale up more in capacity by adding more ingress tiles with the same bandwidth requirement on each element.

The hybrid-shared switch architecture also has the following advantages over the input-output-buffered architecture. For example, a larger buffer space available to all ports to store data in the event of temporary over-subscription of an output port. Since there are fewer ingress buffers, each one has a significantly larger percentage of the overall payload buffer. Further, less overhead may be needed for queueing control structures. The input-output-buffered architecture requires a full set of virtual output queues at each ingress buffer block. While the hybrid-shared switch architecture also requires a full set of virtual output queues at each ingress buffer, the hybrid-shared has fewer buffers so the number of redundant VoQs is greatly reduced. In the hybrid-shared switch architecture, temporary collisions of the cell requests are non-blocking. The reordering of read requests of cells and internal speed-up makes the hybrid-shared architecture non-blocking while the input-output-buffered architecture may suffer input blocking from source congestion under various traffic patterns. A single centralized main scheduler may be aware of all VoQs and thus allows for optimal scheduling across both input tile buffers. The main scheduler can take into account source tile availability as well as the QoS requirements.

In each of the ITMs 530A-B, a set of output port queues (e.g., virtual output queues (VoQs)) maybe enqueued. The main scheduler 540 may be configured to select an ITM of the ITMs 530A-B in the hybrid-shared traffic manager 510 and to select VoQs in the selected ITM. Each of the ITMs 530A-B may be able to handle a maximum number of dequeues per cycle, and thus the main scheduler 540 may schedule up to this maximum per cycle per ITM. In one or more implementations, the input tile read bandwidth may provide overspeed compared to the input tile write bandwidth. For example, each of the ITMs 530A-B may be capable of writing X cells per clock while being capable of reading X+overspeed cells per clock. Each of the EB components 570A-H may implement a shallow destination buffer for burst absorption plus flow control isolation.

The payload memory of each ingress buffer of the Ingress Data Buffers 532A-B may be partitioned into segments referred to as memory banks, where the total read and write bandwidth is higher than the bandwidth of each memory bank. Each memory bank may be accessed in parallel to other memory banks, and thus a read operation and/or a write operation may be performed at each memory bank. In some cases, the payload memory may include a large number of memory banks, but only a fraction of available bandwidth may be used.

In addition, the control paths may be configured for multi-cell enqueue and multi-cell dequeue. Traditionally, a traffic manager control structure may be capable of enqueueing and dequeueing 1 or 2 packets or cells per cycle. For example, traditionally, each packet received may trigger generating an enqueue, and each packet transmitted may trigger a dequeue, which may set the enqueue/dequeue rate to be greater than or equal to a maximum packet per second for a switch. However, the traditional approach may limit the ITM capacity, where, for example, a 4 input/output ITM may require 16 port memories (4 enqueues and 4 dequeues, each requiring read and write) for VoQ state.

In the hybrid-shared switch architecture 500, to provide a high capacity ITM while providing capability to receive 1 packet or cell per clock from each input pipeline and to transmit 1 packet or cell per clock to each egress pipeline, a control path in each ITM (e.g., ITM 530A or 530B) may be configured to handle multi-packet enqueues and multi-packet dequeues. By creating multi-packet events with multi-packet enqueues and dequeues, the frequency of events being handled by the control path decreases, which may allow the hybrid-shared traffic manager 510 to operate at lower frequencies and/or use more efficient lower port count memories. For example, each ITM may support 6 input pipelines and thus an average of 6 packets per cycle may be enqueued. For larger packets, multiple cells of a large packet may be enqueued at a time. Smaller packets may be accumulated together to allow multi-packet enqueue and multi-packet dequeue. For example, a single scheduling event may naturally dequeue 6 or more cells (e.g., from single large packet or multiple small packets). Multiple small packets may also be accumulated for single multi-packet enqueue events to output queue.

Each ITM may also include a shared buffer that maybe a high bandwidth buffer, where the buffer is partitioned per ITM. For example, each ITM may support 8 writes and 8+overspeed reads per cycle. There is no limitation on sharing within each ingress buffer (e.g., ingress buffer 532A or 532B).

In some examples, the shared buffer may be implemented using efficient memories. For example, the total payload buffer size may be 64 MB, with 32 MB of a shared buffer (e.g., ingress buffer 532A or 532B) per ITM, implemented as N banks of (32 MB/N) MB per bank. A memory bank may perform 1 read or 1 write per clock cycle. The write bandwidth may be deterministic (e.g., with flexible addressing). The read bandwidth may be non-deterministic (e.g., with fixed addressing), where reads cannot be blocked by writes and reads can be blocked by other reads.

Figure 6:
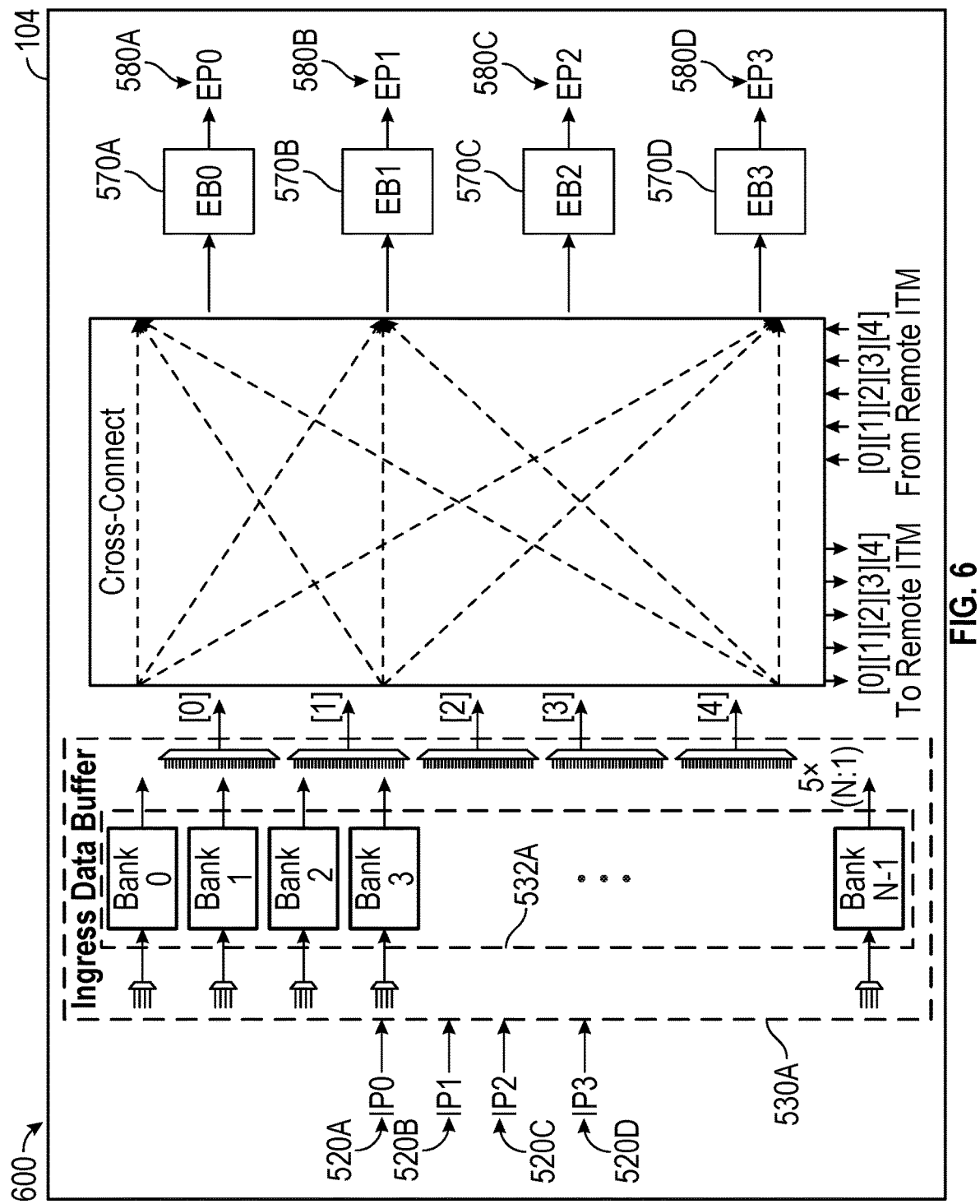
FIG. 6 is an example diagram illustrating banks of a buffer per ITM in a hybrid-shared switch architecture and data paths to egress buffers within a network switch, in accordance with one or more implementations.

FIG. 6 is an example diagram 600 illustrating banks of a buffer per tile in a hybrid-shared switch architecture and data paths to egress buffers within a network switch, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 6, the network switch 104 may include the ingress buffer 532A configured to receive data via IPs 520A-520D and EB components 570A-570D. In an example data path for the ITM 530A of the hybrid-shared switch architecture, the ingress buffer 532A may be divided into N payload memory banks. 4 writes per cycle may be performed into the ingress buffer 532A and 5 reads per cycle may be performed from ingress buffer 532A. The 5 reads from the ITM buffer memory may be meshed with 5 reads from another ingress buffer (e.g., ingress buffer 532B) from another ITM (e.g., ITM 530B), and then the results may be sent to 4 EB components 570A-570D, to be output through 4 EPs 580A-580D. No more than a maximum number of cells per cycle may be sent to a single EB component of the EB components 570A-570D from the ingress buffer 532A. In one or more implementations, a small EB staging buffer may be implemented per EP to reorder read data and to absorb short bursts per EP.

In one or more implementations, a control plane of the hybrid-shared switch architecture may not need to scale to the highest packet-per-second (pps) rate. VoQ enqueue/dequeue events may be reduced, and the enqueue rate and the dequeue rate may be less than smallest packet pps rate. Multi-packet enqueue/dequeue events may require VoQ enqueue and dequeue cell or packet accumulation, and/or may require multi-packet enqueue/dequeue control structures. Controlled distribution of accesses are distributed across physical memories may reduce individual memory bandwidth requirement.

In the subject technology, an increased number of input port interfaces are available per control plane, and thus fewer control planes may be needed. Fewer control planes may require fewer VoQ structures, which may reduce the area taken by VoQ structures and/or may reduce partitioning of output queue guarantees/fairness. Further, the increased number of input port interfaces per control plane improves sharing of resources among sources within a tile and may also reduce source congestion. For example, a single pipeline may burst to egress at higher than a pipeline bandwidth (within an input tile limit). In addition to sharing within the input tile, the input tile may provide the overspeed, as discussed above (e.g., 5 cell reads for 4 input pipelines). The control plane may be implemented using low port count memories due to low rate multi-packet enqueue and dequeue events.

For larger packets, multi-cell enqueues may be created by having a reassembly FIFO per input port accumulate the packet which may then be enqueued as a single event to its target VoQ. For small packets that are each targeting different VoQs, reassembled packet state is not sufficient. Thus, according to an aspect of the disclosure, the total VoQ database may be segmented into N VoQ banks, where each VoQ bank has (total VoQs/N) VoQ entries and there is no duplication of VoQ state. Output accumulation FIFOs are implemented prior to the VoQ enqueue stage where cells within each FIFO cannot address more than M VoQs in any VoQ bank, where M is the maximum number of VoQ enqueues that a VoQ bank can receive per clock cycle. Multiple cells may then be read from a FIFO addressing up to N VoQs knowing that no more than M VoQs in any bank is accessed by the event. In an example implementation, N=8 and M=1.

The following description explains the traffic manager control plane with regard to the ITM 530A, as an example. Another ITM (e.g., ITM 530B) may include a similar traffic manager control plane to the traffic manager control plane of the ITM 530A. The traffic manager control plane of the ITM 530A may include an orthogonal queue set (OQS) block 1414 as part of the Queueing block 830A. The traffic manager control plane may reside in the ITM 530A. In one or more implementations, the traffic manager control plane may reside in the queueing component 534A of the ITM 530A. In one or more implementations, the Queueing component 534A may utilize the ingress buffer 532A to store data and/or queues. The Queueing block 830A is connected to a main scheduler 540 of the traffic manager, where the main scheduler 540 is capable of communicating with a read launcher (RL) 550A. The RL 550A communicates with the ingress buffer 532A to read data packets to be forwarded to EPs via an EB block. The ingress buffer 532A may also communicate with the ingress buffer 532B of the ITM 530B. Additional details regarding the OQS block 1414 and its parent Queueing block 830A and the RL 550A are provided infra.

At the OQS block 1414, the output accumulation FIFO of the OQS block 1414 may accumulate cells/packets for the same VoQ(s) to create multi cell and/or multi-packet enqueues. This allows the control path enqueue rate to be less than the maximum packet per second rate. The OQS block 1414 may compress multiple enqueues into OQS queues. At the OQS block 1414, each packet received from the input pipelines may be switched to an output accumulation FIFO in the OQS block 1414. For example, the OQS block 1414 may receive up to 4 cells per cycle from the input pipelines.

Further, at the OQS block 1414, the output accumulation FIFO may also accumulate cells/packets within each output accumulation FIFO for a set of VoQs. The set of VoQs within an output accumulation FIFO may be called an OQS, where each VoQ within the same OQS is put in a separate VoQ bank in the Queueing block. Thus, draining the output accumulation FIFO in the OQS block 1414 may generate one or more VoQ enqueues (e.g., up to the number of VoQ banks in Queueing block 830A) that are distributed across VoQ banks in the Queueing block 830A, each VoQ enqueue to a different VoQ bank. Each VoQ enqueue may be a multi-cell and/or multi-packet enqueue, i.e. add from 1 to maximum number of cells per clock cycle to the VoQ. This may achieve multiple VoQ enqueues per clock cycle using VoQ banks in the Queueing block 830A, where each VoQ bank supports 1 VoQ enqueue per clock. In one or more implementations, a VoQ block may contain multiple enqueues per clock cycle in which case the OQS set of queues within an Output Accumulation FIFO may contain multiple VoQs in each VoQ bank.

Up to X cells from the input pipelines can be written to between 1 and X output accumulation FIFOs per clock cycle. For example, all packets/cells may be written to one output accumulation FIFO or may be written to one or more different output accumulation FIFOs. In some aspects, the output accumulation FIFO throughput may be large enough to ensure no continuous accumulating build up and to avoid FIFO buffer management/drops. Thus, for example, the output accumulation FIFO throughput may be greater than or equal to total input pipe bandwidth plus any required multicast enqueue bandwidth within the ITM. This also allows the FIFOs to be shallow and fixed in size which minimizes the control state required to manage each FIFO. Although the Output Accumulation FIFOs have a high enqueue plus dequeue rate, there are fewer Output Accumulation FIFOs than VoQs and the control state per Output Accumulation FIFO is considerably smaller than the VoQ enqueue state which the architecture allows to be implemented in area and power efficient memories supporting as low as 1 enqueue per clock.

The output accumulation FIFO state has a high access count, e.g., a read plus write for each FIFO enqueue and dequeue event. In one implementation, there may be one output accumulation FIFO per output port and the number of VoQ banks may be equal to the number of queues within a port. In another implementation, there may be one output accumulation FIFO per a pair of output ports and the number of VoQ banks may be twice the number of queues within a port.

The architecture according to the disclosure may ensure that a dequeue from an output accumulation FIFO cannot overload a VoQ bank enqueue rate. Multiple cells may be read from an output accumulation FIFO which can contain one or more packets. For example, one large packet may be read from an Output Accumulation FIFO and enqueued to a single VoQ or multiple small packets may be read to the same or different VoQs. The VoQ bank implementation (and underlying VoQ structure) is configured to support multiple cells/packets being added to a VoQ in a single enqueue update.

Figure 7:
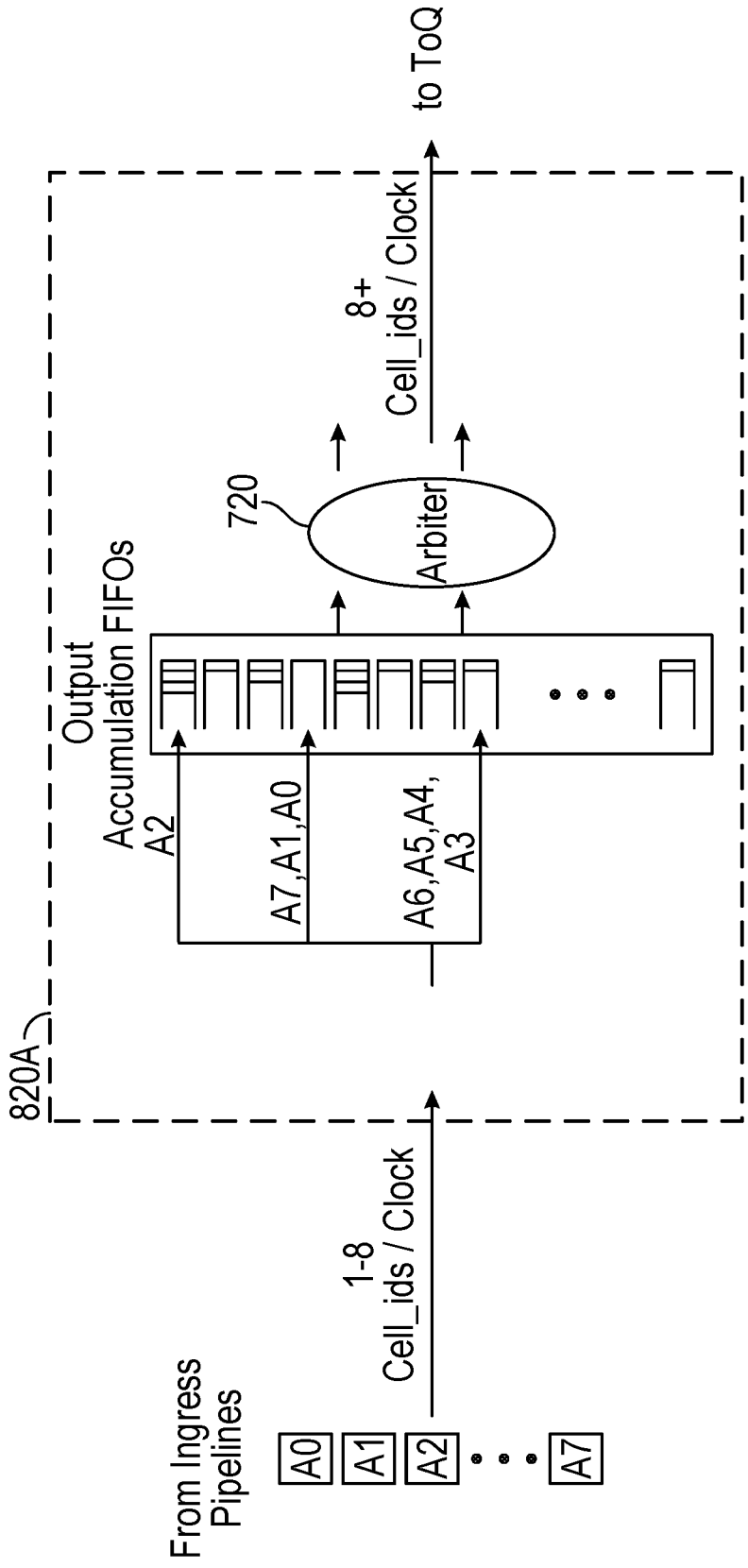
FIG. 7 is an example diagram illustrating an orthogonal queue set block in accordance with one or more implementations.

FIG. 7 is an example diagram 700 illustrating the OQS block in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The output accumulation FIFO provides (output) enqueue accumulation. In one or more implementations, the output port accumulation FIFO for the OQS block 1414 may be a part of the ingress buffer 532A or may reside in the queueing component 534A. The OQS block 1414 receives a serial stream of packets from the Input Pipelines. Up to the number of cells received per clock from the Input Pipelines may be written and the cells to be written per clock cycle may be distributed to one or more of the output accumulation FIFOs. For example, 8 cells in a clock cycle may be distributed to one or more of 8 output accumulation FIFOs. In the example diagram, in one clock cycle, the OQS block 1414 receives 8 cells (A0-A7). Out of the 8 cells in one clock cycle, one cell (A2) is written to one output accumulation FIFO, three cells (A7, A1, and A0) are written to another output accumulation FIFO, and four cells (A3,A4,A5,A6) are written to another output accumulation FIFO. The OQS block 1414 may serve as a control switching point from a source to a destination.

The output accumulation FIFOs may be sized to typically avoid creating back pressure when a large packet is written in to an output accumulation FIFO. The OQS arbiter 720 may dequeue more cells per clock cycle from an Output Accumulation FIFO than are written in a clock cycle. This prevents the output accumulation FIFO reaching its maximum fill level and provides additional dequeue bandwidth to read Output Accumulation FIFOs with shallow fill levels. In one or more implementations, each output port or set of output ports may be mapped to an output accumulation FIFO.

The OQS arbiter 720 can make up to N FIFO selections per clock cycle to attempt to read Y cells per clock where Y may contain overspeed compared to the number of cells received by the ITM from its Ingress Pipelines in one clock cycle. Different implementations may have different values of N and Y to meet the switch requirements. In an example, N may be 1 and Y may be 6, in another example N may be 2 and Y may be 8. The OQS arbiter 720 may generate a serial stream of packets. For example, the OQS arbiter 720 may completely drain one output accumulation FIFO to end of packet before switching to a different output accumulation FIFO. The output accumulation FIFOs with the deepest fill level (quantized) may have the highest priority followed by FIFOs that have been in a non-empty state the longest.

The OQS arbiter 720 may use a FIFO ager scheme. The FIFO ager scheme is used to raise the priority of aged FIFOs with shallow fill levels above other non-aged FIFOs also with shallow fill levels. FIFO(s) with high fill levels (aged or not) have highest priority as these have efficient dequeues that provide over speed when selected and free up dequeue bandwidth for less efficient shallow dequeues. The output FIFO ager scheme of the OQS arbiter 720 may further be able to set the ager timer based upon the output port speed and queue high/low priority configuration. Hence, for example, an output FIFO ager scheme may be used to minimize the delay through the output stage for packets requiring low latency.

Figure 8:
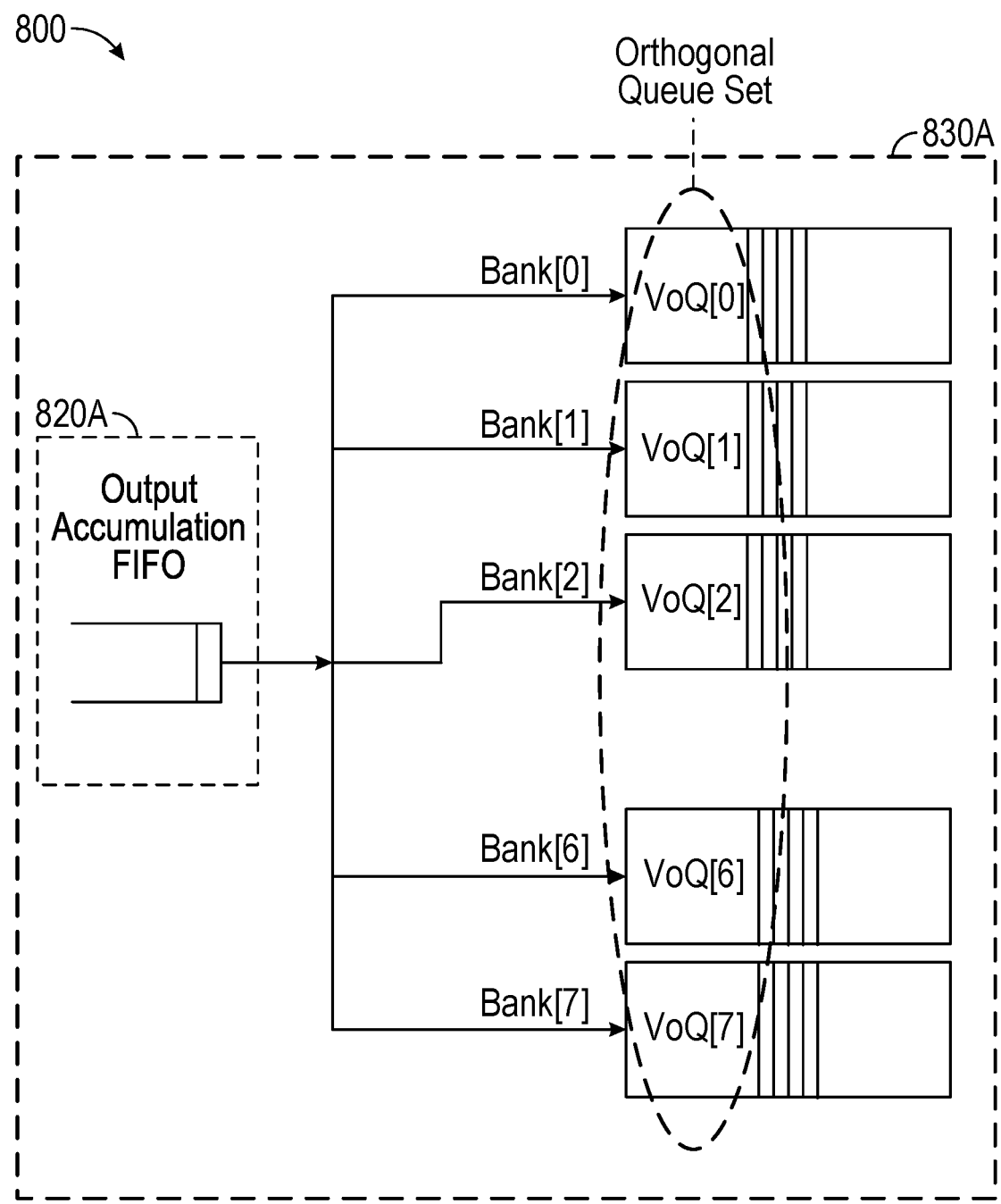
FIG. 8 is an example diagram illustrating a Queueing block partitioned to support Orthogonal Queue Sets in accordance with one or more implementations.

FIG. 8 is an example diagram 800 illustrating a Queueing block 830A in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The Queueing block 830A implements a VoQ banking stage containing VoQ accumulation for multi cell dequeue events (single dequeue can be multiple cells). Cells from the same output accumulation FIFO 820A cannot overload any one VoQ bank. Other control structures such as Output Admission Control may have the same banking structure as the VoQ banking in Queueing block 830A. Controlled distribution of multi cell enqueues across physical memory banks is performed. In one or more implementations, the VoQ banks of the Queueing block 830A may be a part of the ingress buffer 532A or may reside in the queueing component 534A.

This structure performs multi cell enqueues to one or more VoQs within an OQS block each clock cycle while implementing the VoQ banks with databases that only support as low as one enqueue per clock cycle. Each VoQ enqueue can add multiple cells/packets to the VoQ.

As previously discussed, each read from an output accumulation FIFO may generate enqueue requests for VoQ(s) that do not overload any one VoQ bank. The output accumulation FIFO stage can provide up to Y cells from N output accumulation FIFOs in each clock cycle. This may generate N VoQ enqueues per clock cycle where each OQS is assigned one VoQ per VoQ bank or a multiple of N VoQ enqueues per clock cycle where each OQS is assigned a multiple of VoQs per VoQ bank. An implementation may support reading from N Output Accumulation FIFOs per clock such that the maximum number of VoQ enqueues generated to a VoQ bank exceeds the number the VoQ bank can support in a clock cycle. If this occurs the implementation should hold back the latest packets that overload the VoQ bank to be enqueued first in the next clock cycle. The VoQ enqueues held back until the next cycle can be combined with new enqueue requests received in the next cycle.

Figure 9:
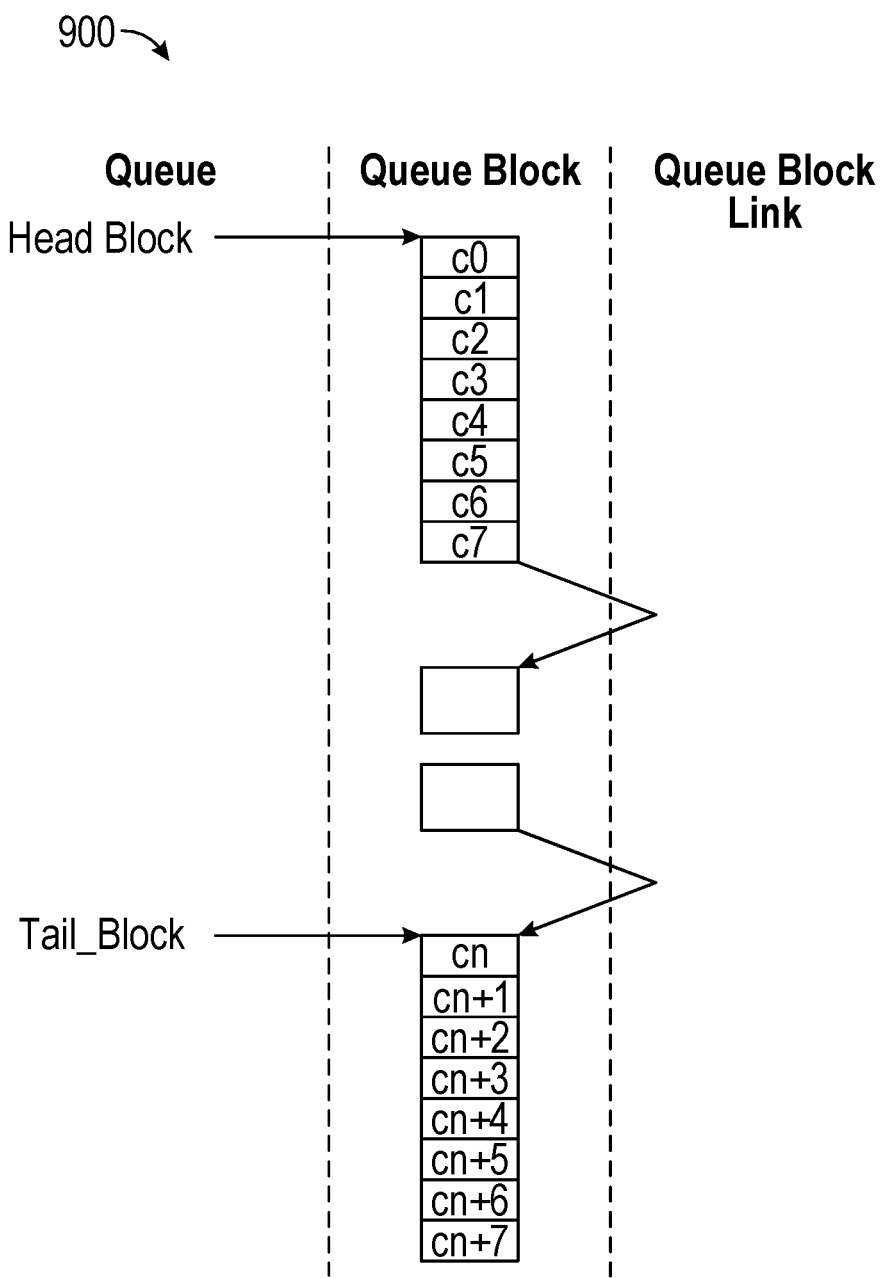
FIG. 9 is an example diagram illustrating a queue structure, in accordance with one or more implementations.

FIG. 9 is an example diagram 900 illustrating a Hybrid-shard queue structure, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

Each cell (or packet) within a VoQ is assigned a slot entry in a Queue Block to hold the cell/packet's control state. The VoQ structure for the VoQ in FIG. 9 is constructed of a linked list of Queue Blocks, where the Queue Block Link database is used to create the links. This VoQ structure has the benefit of allowing multiple cells or packets within a single Queue Block to be read in one access while still supporting the flexible and dynamic allocation of Queue depth to active VoQs. Thus, backlogged queue is constructed of dynamically allocated Queue Blocks. For example, this VoQ structure in FIG. 9 includes a Queue Block implementation containing 8 cells or packets per Queue Block. The cell control holds cell payload memory address. Up to 8 cells can be written to a VoQ Queue Block per clock cycle.

In one or more implementations, the number of cell control slots within a Queue Block may change depending upon the size (number of cells) and frequency of the device's multi-cell enqueues and dequeues.

Configurable mapping of {EP number, MMU Port number, MMU Queue number} to VoQ banks may be provided. The mapping may avoid the same MMU Queue number for all ports being mapped to the same VoQ bank. For implementations where N OQS FIFOs are read in a clock cycle that may overload the maximum enqueue rate of a VoQ bank(s), the mapping can attempt to distribute the enqueue load across the VoQ banks to reduce the probability of any one bank being overloaded.

According to one or more implementations, the subject disclosure has a payload memory per ITM. For example, an ITM payload memory supports NUMIPITM cell writes plus (NUMIPITM+X) cell reads per clock cycle, where NUMIPITM is the number of IP interfaces connected to the ITM and X is the required read overhead to minimize input blocking and egress buffering to maintain port throughput. The subject disclosure's data path allows a payload memory supporting multiple writes and reads per clock to be implemented using efficient single port memories. To achieve such features, the total ITM payload depth is segmented into a number of shallower payload memory banks. Thus, an ITM payload memory may be segmented into multiple payload memory banks. Each payload memory bank may be partitioned in to several payload memory instances. An example payload memory may support each payload memory bank supports one write or one read per clock, which can be implemented using one or more single port memory instances.

With regard to the dequeue feature of the subject disclosure, the dequeue architecture utilizes multi-cell VoQ dequeues to support dequeue rates lower than the required packet per second rate. In one or more implementations, the number of dequeues per clock and the maximum number of cells per dequeue may be set so that the maximum total dequeue cell rate is higher than the sum of the required output port bandwidth to allow for shallow VoQ dequeues. Under maximum VoQ enqueue loads, shallow dequeues may cause other VoQs to back up which can then be drained at (up to) the maximum rate to achieve the overall required throughput. The number of cells per dequeue and the number of dequeues per clock cycle may be device specific.

Each of the RLs 550A-B may buffer bursts of read requests. For example, the RLs 550A-B may each generate a maximum of 8 cell read requests to payload memory per clock. The goal may be to issue the 8 oldest non-conflicting payload reads. The RLs 550A-B may each reorder read requests to avoid payload memory bank collisions. Each of the RLs 550A-B may back pressure the main scheduler 540 if a generated read request rate cannot keep up with the dequeue rate. The RLs 550A-B may exchange state to minimize the cell read burst length for an EB.

EB buffering may behave almost as a single port FIFO. The EB components 570A-H may not interfere with priority/fairness decisions of the main scheduler 540. In one or more implementations, each of the EB components 570A-H may contain multiple queues to allow for fast response to Priority-based flow control.

In one or more implementations, the main scheduler 540 may be configured to select a VoQ from which a number of cells will be dequeued. The selection may attempt to maintain output port bandwidth while selecting VoQs within the port to adhere to the port's QoS configuration.

In this architecture each dequeue selection can read multiple cells from a VoQ. For simplicity, in one or more implementations, it is expected (though not required) that each dequeue will read a maximum of the number of cell slots within a Queue Block, e.g. 8 using the VoQ structure shown in FIG. 9. The main scheduler 540 may adjust back to back port selection spacing based upon the port speed but also the number of cells within each dequeue. An ITM may not be able to provide sufficient dequeue bandwidth for all output ports. The main scheduler 540 may consider loading and availability of VoQs in both ITMs and optimize throughput by issuing dequeues to each ITM when possible without compromising a port's QoS requirements.

The main scheduler (e.g., main scheduler 540) transmits packets from the ITM payload buffers (e.g., ingress buffers 532A-B) to an egress buffer of an EB component per EP interface or set of EP interfaces. As the main scheduler can transmit with overspeed to each port, the EB component can contain several packets per port. In addition to the main scheduler, each EB component may or may not contain its own scheduler to transmit from the EB component to its EP interface(s). This EB scheduler matches the main scheduler's strict priority policies (to minimize strict priority packet latencies through the EB component) and port bandwidth allocations.

As the main scheduler can schedule multiple cells per dequeue, it can generate significant overspeed when scheduling full dequeues. The dequeue control and data path may have restriction on the number of total cells, cells per EB component and cells per port that the main scheduler should observe. This may be implemented using credits/flow control and scheduler pacing (awareness of maximum and average burst cell rates for total, EBs and Ports). EB rates are constant across EB components independent of the port bandwidth active within an EB component. Thus, the main scheduler does not attempt to control EB fairness. Port rates are different for the different port speeds supported by the device, and may have configured values.

Minimum port to port spacing may be enforced based upon number of cells within each dequeue. One or more implementations may also consider the number of bytes to be transmitted from each cell. Dequeues with higher number of cells or bytes may observe longer port to port spacing to allow other ports to obtain more dequeue bandwidth, even with higher spacing the port is still allocated overspeed compared to the required rate to the EP.

Figure 10:
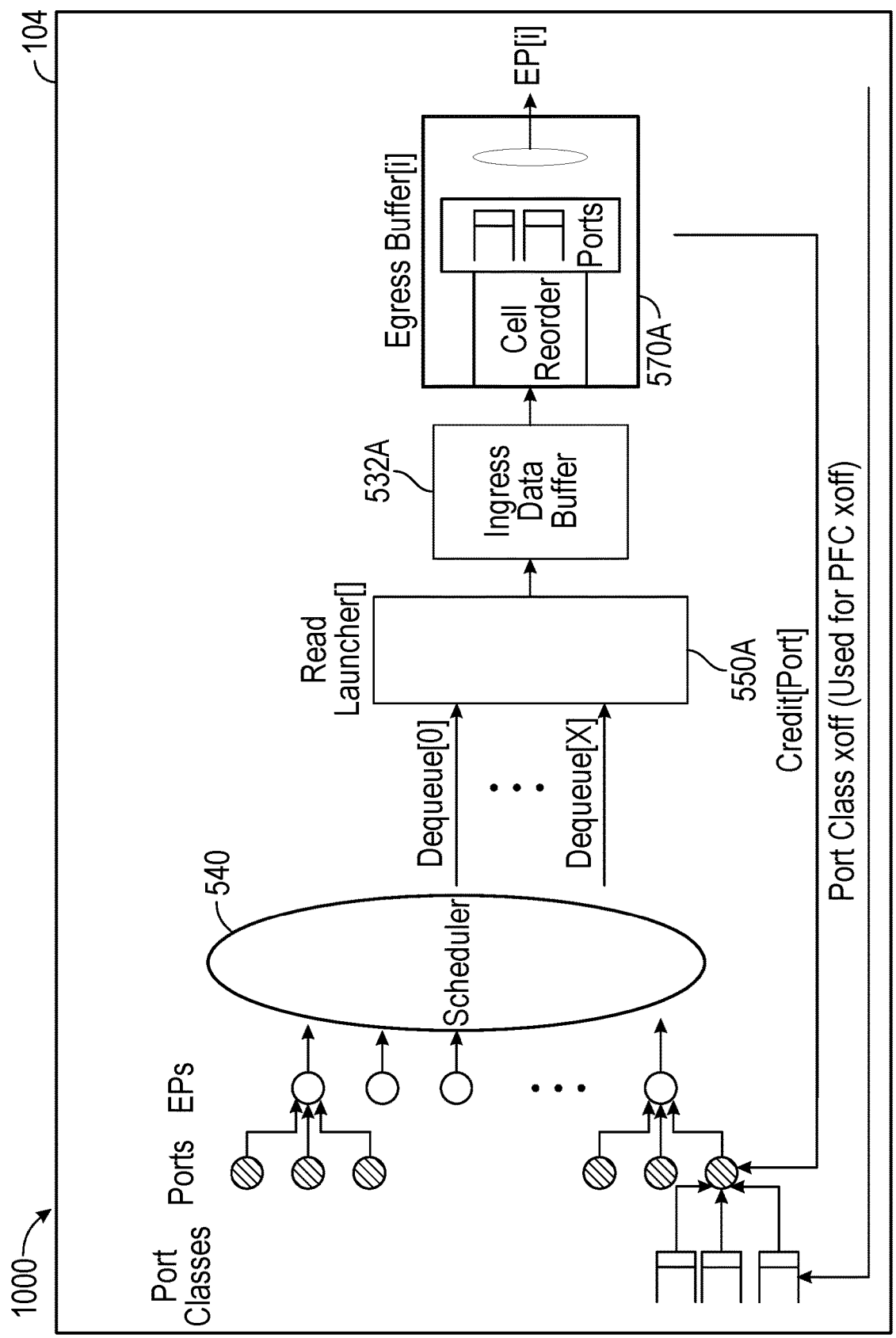
FIG. 10 is an example diagram illustrating rate protected dequeue control/data path limits for a network switch, in accordance with one or more implementations.

FIG. 10 is an example diagram 1000 illustrating credit protected dequeue control/data path limits for a network switch (e.g., network switch 104), in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in FIG. 10, the main scheduler 540 may observe the output port credit within the EB component 570A, and may determine whether to select an output port based on the observed output port credit. Scheduler picks by the main scheduler 540 are passed to an ITM's Queueing block which retrieves the cell control including payload read address before issuing cell read requests to the RL.

Each dequeue accesses a different VoQ state within the Queueing block. As described within the enqueue flow, the Queueing block contains VoQ banks and the OQS FIFOs control the number of enqueues addressing each bank. In certain applications, the scheduling decision may ensure that the dequeue rate to any VoQ bank does not exceed the bank's guaranteed dequeue bandwidth. For an example implementation in FIG. 11 that supports 2 dequeues per VoQ bank, the main scheduler 540 may be unaware of VoQ banking in which case both dequeues could access the same VoQ bank. In other applications, the number of dequeues per bank may be more or less than 2 dequeues per clock. The scheduler may actively select VoQs to avoid overloading a VoQ bank's dequeue rate without impacting the port's QoS requirements. In other applications, the scheduler VoQ selections may overload a VoQ bank's dequeue rate in which case later VoQ selections may be held back to subsequent clocks.

Figure 11:
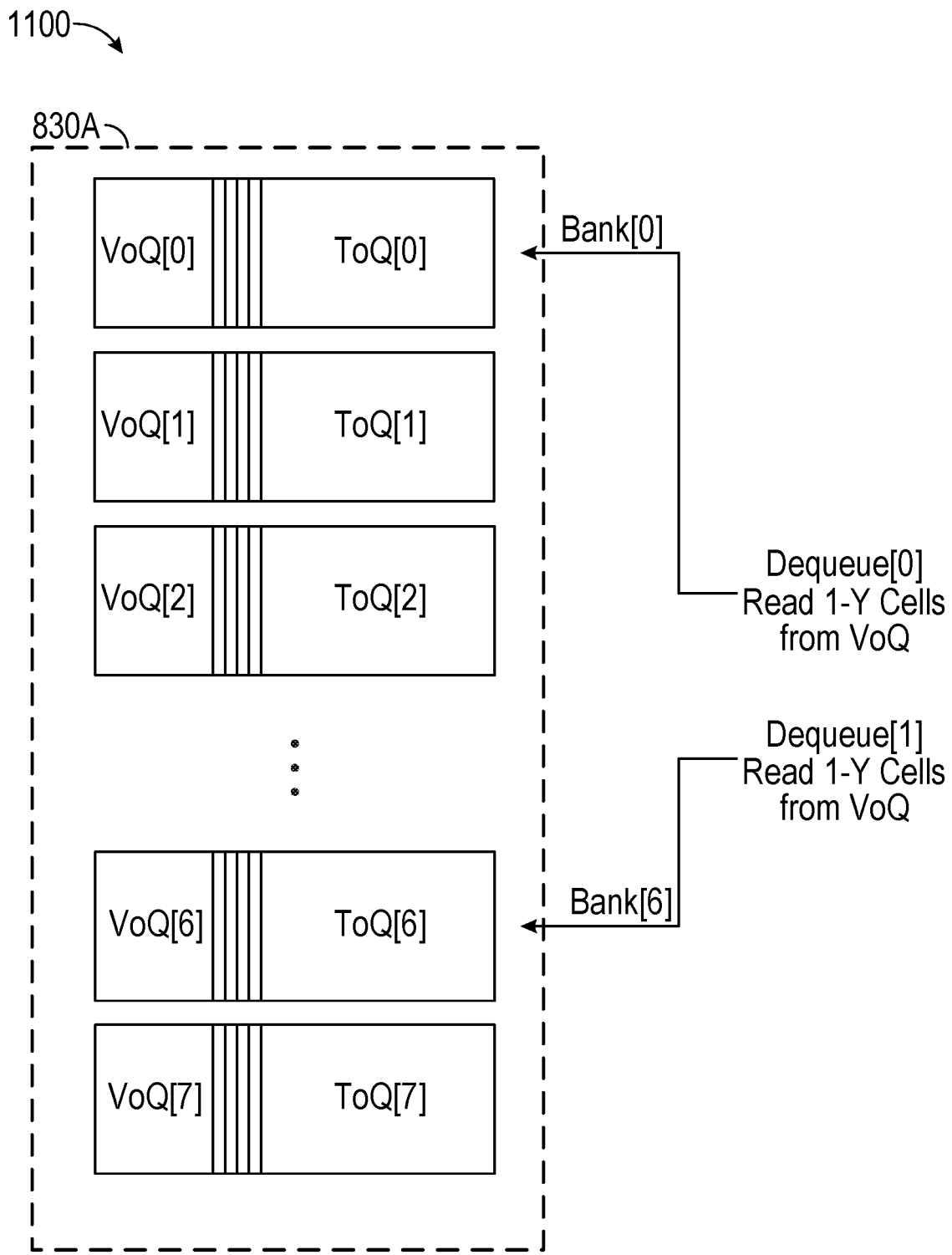
FIG. 11 is an example diagram illustrating a queue dequeue, in accordance with one or more implementations.

FIG. 11 is an example diagram 1100 illustrating a set of dequeues in one clock cycle, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The queue database (e.g., in the Queueing block 830A) may support up to Z dequeues per clock cycle. Each dequeue is independent. The dequeues may be for the same or different VoQ banks within the Queueing structure. In FIG. 11 with Z=2, each bank supports 2 simultaneous dequeue operations. Each dequeue results in 1-Y cell addresses out of Queueing block 830A (e.g., up to ZY cell addresses total with 2 dequeues).

One task performed by the EB component may be to reorder cells per ITM to original scheduler order. The Read Launcher 550A can reorder cell read requests issued to the ITM to optimize payload memory bandwidth while avoiding payload bank read collisions. The EB component contains a reorder FIFO that reorders the cell read data to the original scheduler order. Once reordered, the cells are forwarded to the EB queues.

Another task performed by the EB component is to observe flow control. Pause or PFC flow control to each port may be supported. If pause xoff is received, the EB will stop transmitting the port to the EP and the state may be mapped back to the main scheduler to stop it scheduling to this port. The implementation may allow the EB port FIFO to fill, which will cause the main scheduler to run out of EB port credits and stop scheduling to that port. In one or more implementations, no packet loss due to pause is allowed.

For PFC flow control, each port can receive, for example, up to 8 PFC Class xon/xoff flow control status. This state may be mapped back to MMU Queues within the main scheduler so that the main scheduler will stop transmitting from VoQ(s) that are mapped to a PFC class in an xoff state. Further, the EB implementation may support multiple PFC class queues per port that can also be flow controlled by PFC Class(es) to enable faster PFC response times. PFC class(es) mapped to EB PFC class queues may also be mapped to MMU Queues that are mapped to that EB PFC class queue. The EB PFC class queue will stop draining from the EB component and the main scheduler should stop transmitting to the EB PFC class queue.

In one or more implementations, there should be no packet loss within the dequeue flow due to PFC flow control. In this regard, the EB scheduler may not transmit packets from EB PFC class queues in an xoff state to the EP while allowing packets to transmit to the port as long as they are mapped to an EB PFC class queue in an xon state. EB PFC class queues may require EB buffering to absorb packets that were in flight when xoff was received.

Another task performed by the EB component may be EB scheduling to the EP interface. Each EB component may contain an EB scheduler to allocate bandwidth to each port within the EB component. Each port should be allocated a fair portion of the EP bandwidth in line with that allocated by the main scheduler.

Figure 12:
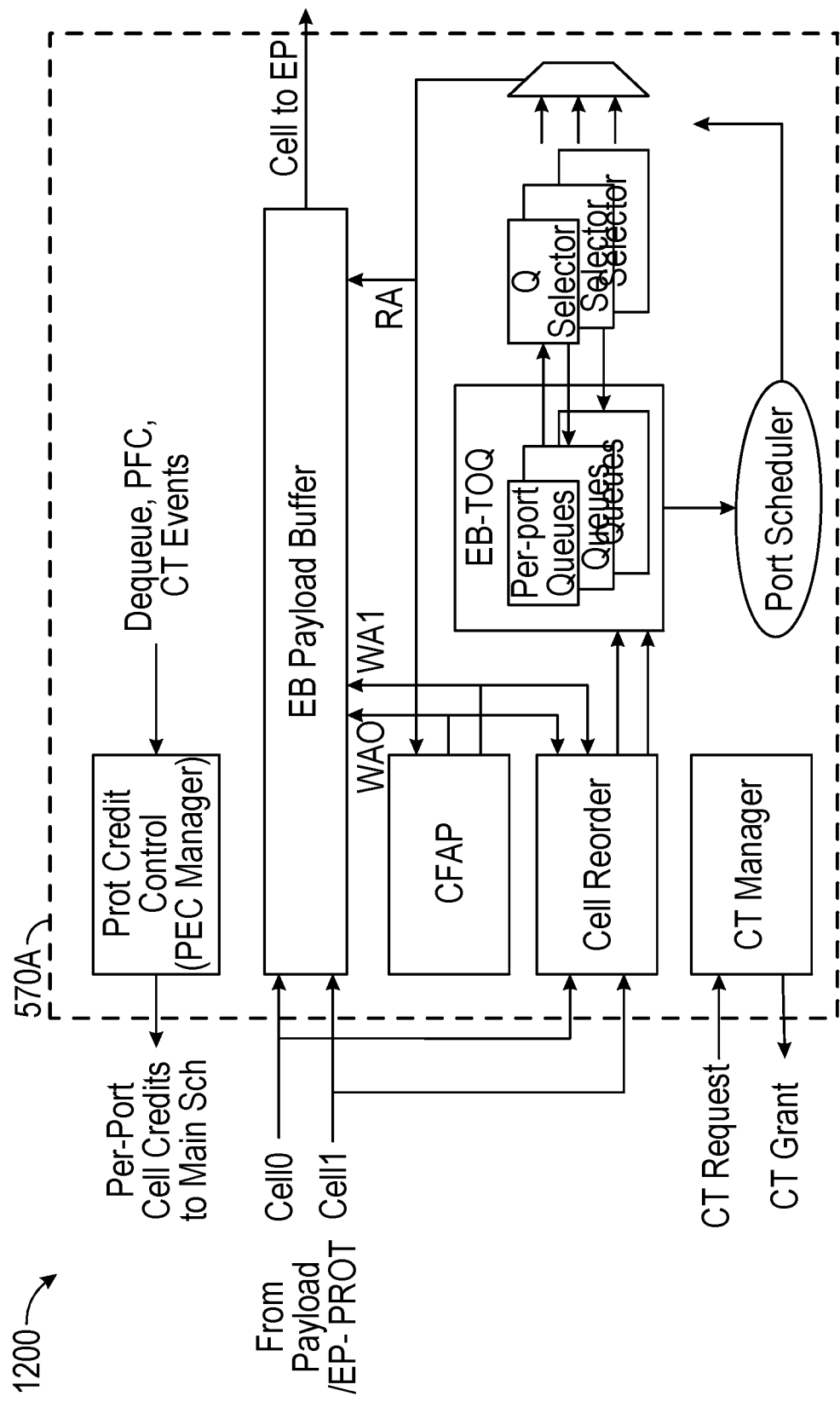
FIG. 12 is an example diagram illustrating an egress buffer architecture, in accordance with one or more implementations.

The EB component may contain a set of PFC class queues per port. To minimize latency for strict priority packets, an EB PFC class queue can be configured for strict priority selection against other EB PFC class queues within the same port. In addition to observing PFC flow control, this allows strict priority packets to bypass lower priority packets already stored within the EB component. The EB component 570A contains minimum buffering needed to maintain full line rate FIG. 12 is an example diagram 1200 illustrating an egress buffer component architecture, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In the example diagram 1200, there is one EB component per EP. The EB component 570A contains minimum buffering needed to maintain full line rate. The EB component 570A implements a second SAF point due to non-deterministic delay through RL and ingress buffer. As shown in FIG. 12, the EB component 570A receives 2 cells per cycle from main tile buffers and writes 2 cells per cycle into the EB component 570A (e.g., cell0 and cell1). The EB component 570A reads 1 cell per cycle to send to the output port 580A.

A network switch generally supports two methods of passing packets from input ports to output ports, which are store-and-forward (SAF) and cut-through (CT). Thus, the hybrid-shared traffic manager architecture may also support the SAF switching and the CT switching. The SAF switching accumulates entire packets in the ITM's data buffer before scheduling and transmitting it to the output port. The SAF switching is utilized when an output port is congested. When two or more input ports attempt to send data to the same output port, the output port becomes congested and thus enters an SAF state. In the SAF state, all packets should be completely received before the first byte of the packet is allowed to exit the switch output port, which may cause a longer latency than the CT state.

In CT switching, partial packet data may be forwarded to the output port as soon as the partial packet data arrives at the ITM (e.g., instead of waiting for the entire packet to accumulate). For example, the CT operation allows each cell to be sent to its output port on cell-by-cell basis, as soon as a cell is received, even before all cells for the packet are received. When there is no stored traffic for an output port, the next packet that arrives on any input port can "cut-though" to the uncongested output port with low latency. This output port is said to be in the CT state. The CT switching provides a low latency path through the network switch, compared to the SAF path.

For a start-of-packet (SOP) cell in a packet, the traffic manager decides whether to take the SAF path or the CT path. Once a decision is made for the SOP cell of the packet, all following cells of the packet may follow the same path. An output port may change back and forth between the CT state and the SAF state depending on traffic conditions. Several conditions determine whether the output port should be in the SAF state or the CT state. The output port may be set to the CT state when the output port's queues are empty, or the output port is not backlogged, or by default. A packet data newly arriving at the traffic manager may be allowed to cut through when the output port is in the CT state. When an output port becomes backlogged with data traffic, the output port may change from the CT state to the SAF state and newly arriving packet data may follow the SAF path. Newly arriving packets follow the SAF path when the output port is already in the SAF state. When the output port becomes uncongested (e.g., no backlog and/or empty output port queues), the output port may change to the CT state.

When packet data is passing through the MMU (e.g., traffic manager) on the CT path, such packet data may have priority over packet data on the SAF path, so as to maintain low latency and simplicity of the CT control. For example, the priority may be given to the packet data on the CT path when reading data cells out of the main ITM data buffer, passing cell data from ITM ingress buffer to the EB buffer and/or writing and reading cell data into and out of the EB data buffer.

When an output port is switched into the SAF state, it can be difficult for the output port to go back to the CT state. Even if all but one input port stops transmitting to the given output port, the output port can remain in SAF state. Because a packet should be fully received before starting transmission in SAF mode, the SAF queue at the output port may not become completely empty unless no data is received for a time period corresponding to receiving at least one full packet. Further, in some cases, the SAF queue in the output port may always be in a mid-packet state of accumulating the next SAF packet to transmit, even if the data rate of incoming packets falls. Hence, the SAF queue(s) may rarely become completely empty and the output port may appear congested even when it is not. Therefore, an approach to easily transition from the SAF state to the CT state is desired. Further, the longer time an output port can stay in the CT state, the better the performance of the switch because more packets experience lower latency through the switch. Thus, maintaining the CT state longer from the beginning may be desired, thereby making the CT state more resilient.

Generally, if an output port is in the SAF state, the traffic manager waits until an output port's queues are completely empty before allowing the output port to change to the CT state. According to an aspect of the disclosure, the output port in the SAF state may enter a transition CT (TCT) state before entering the CT state. If the transition to the CT state is successful, the output port transitions from the TCT state to the CT state. After moving to the TCT state, the output port may fail to fully transition to the CT state. For example, the transition to the CT state may fail if a new burst of traffic comes in for the output port while the output port is in the TCT state. If the transition from the TCT state to the CT state fails, the output port may return to the SAF state from the TCT state.

Further, to sustain the CT state, additional features for resilient CT state may be implemented. For example, the resilient CT state may absorb a higher degree of congestion, and/or may absorb transient congestion over a longer period of time. The resilient CT state may allow for high-speed input ports to cut-through to lower-speed output ports. Further, a burst control mechanism may be implemented to minimize burst buffering when multiple ports are in the CT state. For example, small bursts (e.g., especially from fast input ports to slow output ports) may be absorbed without falling out of the CT state.

While low latency is a benefit of CT switching, several restrictions may be placed on the types of packets that are allowed to cut-through. CT eligibility of any packet may be also based on conditions within the MMU. These restrictions are reflected in the CT feature as follows. The CT switching provides low latency from input to output through the MMU. Predictive transition from SAF state to CT state via the TCT is available. The CT switching is allowed between any pair of front-panel ports of the same speed. The CT switching may also be allowed from faster ports to slower ports with some restrictions. One or more, or all, main scheduler minimum and maximum rate shapers are updated for one or more, or all CT packets (e.g., packets on the CT path). One or more, or all, ports in the CT mode respond to PFC with same or better response time as SAF packets. The CT state is resilient in that small bursts (especially from fast to slow ports) are absorbed without falling out of the CT state and after being forced to the SAF state, it is easy to get back into the CT state (using the TCT state).

The CT features that may not be supported in one or more implementations may be as follows. CT switching may not be allowed for multicast packets (CT may be allowed for Unicast only). CT switching may not be allowed for "mirror" packet copies. However, the unicast switched copy of a unicast and mirror packet is still allowed for CT switching while the mirror copy should take the SAF path. CT switching may not be allowed for packets from slower ports to faster ports (due to under-run and complexity considerations). Only one input port may be allowed for CT switching at a time to each output port. If a second packet arrives for an output port in the middle of cutting through a packet from another source port, that second packet should take the SAF path which forces the output port into SAF state. At this point, the output port is oversubscribed and the CT control logic may not have to deal with the interleaved arrival of cells from different source ports for the same output port. There may be no high-priority CT, as the CT path is a single priority path to every output port. It may not be allowed for a high priority packet to take the CT path when other lower priority packets are already accepted or in process to the same output port whether those lower priority packets are currently taking the CT path or SAF path. The CT switching may not be supported along with Pause Flow Control, such as 802.1X Port Pause Flow Control.

To allow CT switching, the CT switching cannot interfere with SAF traffic to other output ports. If a bandwidth bottleneck in the MMU design starts to limit SAF bandwidth because CT switching has a higher priority, then CT traffic is scaled back to allow fair access to the available internal bandwidth to all ports. At any time, some ports within a single EP/EB may be in the SAF state while other ports are in the CT state. Limitations on allowing CT packets with SAF present may include total buffer read bandwidth (Tile Bandwidth of the ingress buffer), avoiding EB Protection overflow (e.g., to stay within the cells per cycle limit to the EBP and the EB), and EB per-pipe bandwidth (Pipe bandwidth) (e.g., mainly due to oversubscribed conditions within a single pipe). It is noted that, when one or more ports are losing bandwidth, all ports in the pipeline (e.g., EB) may be inhibited from CT operation (e.g., due to implications on the EDB start count value).

When an output port is in the CT state and is receiving packets at 100% line rate, the output port can become "oversubscribed" if the EP packet processing adds encapsulation or otherwise causes the output packet size to be greater than the incoming packet size. A back-up of packets within the MMU is unavoidable when this occurs. In one or more implementations, the MMU will change from the CT state to the SAF state when CT packets are backed up within the MMU due to packet size expansion by the EP.

Each EB component has a bandwidth allocation limit for CT and SAF packets. The CT allocation is based on the input port's speed, which can be faster than the output port to which the input port is transmitting. Due to differences in port speeds supported, the total bandwidth limit may be reached before all ports are allowed to enter the CT state. In this case, the CT state is granted on a first-come-first-served basis. In one or more implementations, "port-pair streaming" tests may transmit CT packets on all ports simultaneously, such as when the input port speeds match the output port speeds.

Figure 13:
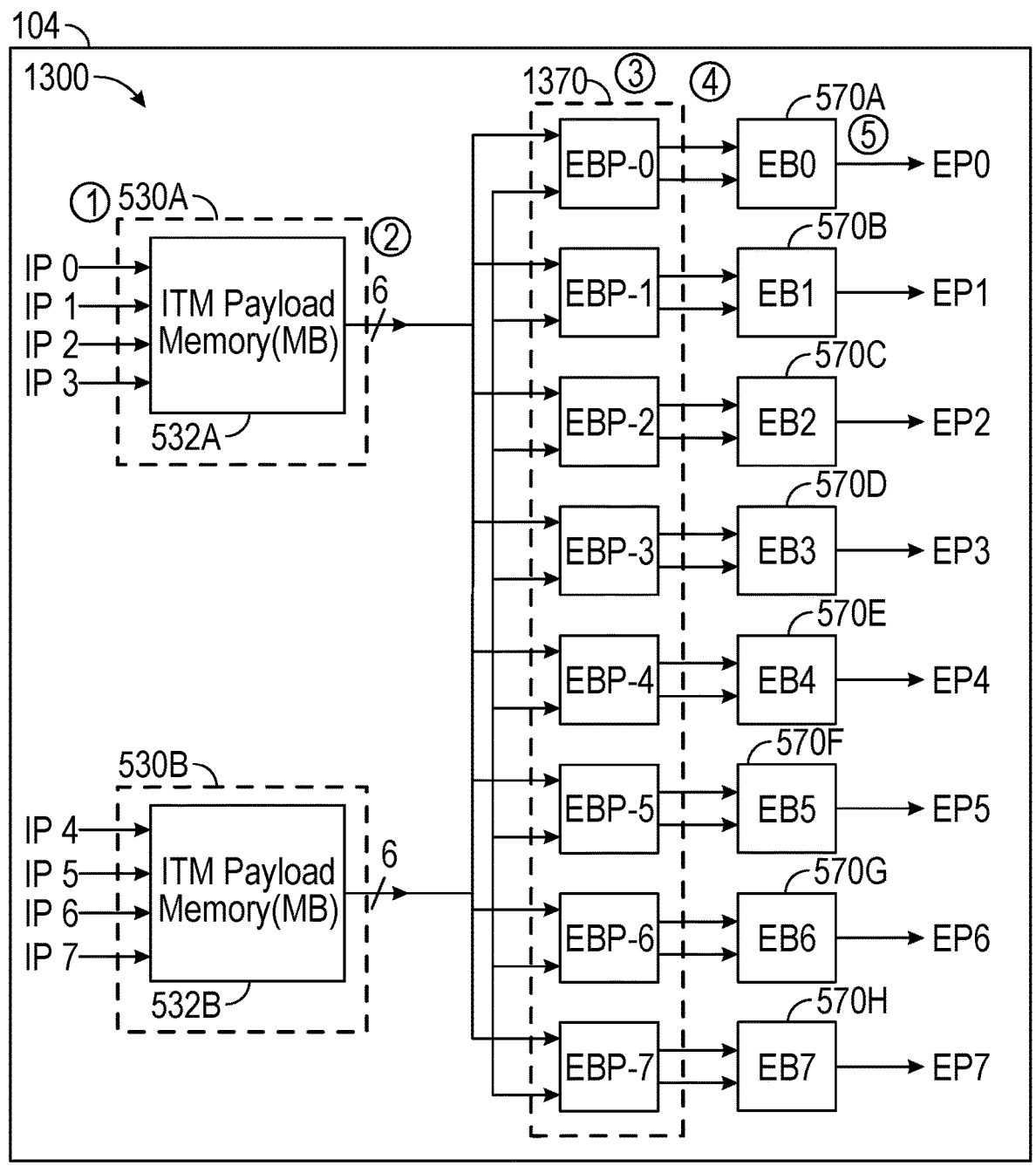
FIG. 13 is an example diagram illustrating a cut-through data path in an memory management unit for a network switch.

The CT data path is the same as the SAF data path, while the CT control path is different from the SAF control path. FIG. 13 is an example diagram 1300 illustrating a cut-through data path in an MMU for a network switch (e.g., network switch 104). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

There are five main steps in passing packet cells through the MMU on a data path, as explained below. At step 1, arriving cells from the input ports are written into the ingress buffer 532A of the ITM 530A. This step is the same for CT and SAF packets. The data cells are written into the ingress buffer 532A in parallel to the cut-through decision processing At step 2, CT cells are read from the ingress buffer 532A. At this point, the cells/packets are marked for CT or SAF. The CT cell data is read from the ingress buffer 532A at a fixed number of cycles after the CT cell data is written. This differs from SAF packets which may be queued and scheduled before being read from the ingress buffer 532A and which therefore have a variable delay before being read from the ingress buffer 532A. Having a fixed delay from a write to a read of CT cell data may simplify the CT processing and may ensure that CT cells can be read from the ingress buffer 532A when needed since ingress buffer write bank addresses are flexibly assigned and guaranteed not to collide. Reading the same ingress buffer addresses in a fixed number of cycles after the CT cells are written to the same ingress buffer addresses may also ensure that such ingress buffer addresses will not experience collision when read.

Ingress buffer read addresses/requests are granted through the RL (e.g., RL 550A or 550B), where the RL may contain FIFOs of SAF read address requests and may select up to six non-bank-colliding addresses per cycle per ITM. In one or more implementations, CT reads may always have higher priority than any SAF reads in the RL. Hence, when a packet is designated for CT, the higher priority allows the CT cells to be read from the ingress buffer in a fixed number of cycles after they are written. Thus, for example, CT reads may be performed before SAF reads. It also means that up to four CT cells per cycle may be read per cycle from each ingress buffer. The ingress buffer supports reading up to six cells per cycle, which is bandwidth that should be divided between CT cells and SAF cells. Therefore, some bandwidth may be available for SAF reads.

The RL may limit the number of SAF cells read from the ingress buffer to two per cycle which are destined to any one of the EB components 570A-570H. With two RLs (e.g., RLs 550A-B) for two respective ITMs 530A-B, for example, in any one cycle, up to four cells destined to a single EB component can be selected by the combined RLs. The two RLs communicate with each other so that the average of two cells per cycle between the two RLs may be attained within a few cycles. This keeps the size of the EB-Protection (EBP) buffering to a minimum. However, with CT decisions for each egress port being independent, the total number of CT cells read from the two ingress buffers for a single EB component can actually be up to eight per cycle. A burst of eight cells per cycle can occur for a single destination EB for a number of cycles. The size of the burst is limited by the number of ports within a single pipeline and by the EB cut-through manager (EB-CTM) CT grants. In addition, the read burst size is limited by the pacing of cells from an IP. The CT burst properties may be a determining factor in designing the EBP, which may not be allowed to overflow.

Allowing CT cells to be staged through the ingress buffer 532A requires the ingress buffer bank address selection for reads and writes to be performed with a strict priority (for each ITM). In one or more implementations, up to four CT reads may always be the highest priority and guaranteed first. Note that the ingress buffer banks cannot collide since the written CT data were also written simultaneously on the ingress buffer banks. SAF reads to non-colliding banks are then selected to make up to a combined maximum of six reads per cycle across both CT reads and SAF reads (by the RL). After the six read banks are known, four non-colliding banks are selected for the four incoming cells from the ingress pipelines (e.g., by the CFAP).

At step 3, CT cells are staged through the EB protection block 1370. A CT operation places a greater buffer requirement on the EB protection block 1370 than the SAF operation alone. The EB protection block 1370 should be able to absorb bursts of 8 CT cells per cycle from the ingress buffer while passing 2 cells per cycle to a corresponding EB component (e.g., EB component 570A). A small amount of variable delay can be incurred by CT cells through the EB protection block 1370. CT and SAF cells are treated equally through the EB protection block 1370 because this is a very small buffer.

At step 4, CT cells are written into the EB data buffer (Ebuf) of the EB component 570A. CT cells enter the EB component 570A and are written directly into the EBuf on the same data path as SAF cells. As soon as a CT cell is written into the EBuf, the CT cell is made available to the EB scheduler for dequeue, unlike SAF cells which should be re-ordered and then re-assembled into complete packets before being eligible for dequeue. Since SAF and CT cells may both be present in the EB component 570A at the same time for a single output port, the CT traffic should be queued separately in the EB component 570A from the SAF traffic so that it may be sequenced out to a corresponding EP in the correct order.

Pipeline oversubscription and differences in DPR clock rates and/or the EP running more slowly than the MMU can cause CT cells to be delayed in the EB component 570A and backup and start to fill the CT EB-Queues. This may be the main point where delay can occur in the CT data path. Too much delay and too much backup in the CT EB-Queues can cause an egress port to switch from the CT state to SAF state so that the CT EB-Queues (and EB itself) do not overflow.

At step 5, the CT cells are read from EB data buffer of the EB component 570A. Although the CT cells are queued separately from SAF cells in the EB component 570A for each port, the EB scheduler does not give strict priority to CT EB-Queues. The EB scheduler is CT/SAF agnostic and schedules among the ports that have data ready to be transmitted to the EP. If cells are present in both the SAF and CT EB-Queues for a given output port, the EBQ scheduler should select between CT and SAF queues based on current port CT state (as maintained by the CTM) to keep packet ordering correct as the port moves between CT, TCT, and SAF states.

CT packets bypass normal SAF queueing and scheduling, eliminating the latency through these blocks. The time saved by the CT packets taking the CT path may be more significant in the subject disclosure than previous chips due to the multi-cell enqueue and dequeue architecture on the SAF path. CT cells bypass the blocks (and corresponding latency) in the MMU, such as a source context block/FIFOs, a THDI/THDR block, an OQS block, a ToQ block (CQE Queueing), a THDO block, a scheduler, and a read launcher (Queueing delay related to RL-EBQs.)

When a packet arrives from the input ports, it is held in the cell receive block (CRB), and a request (e.g., Ct request) is made to the output port's cut-through manager (CTM) of the EB component for a CT decision. The CTM also keeps track of the number of cells in the ingress buffer that are marked for SAF as well as a count for CT so that it knows how many cells of each type to expect at the EB component. This may be important when changing between the SAF state and the CT state. The CTM keeps the CT state for every port, and also keeps information across ports within a single pipeline. The CTMs for respective EB components can operate independently, and, in fact are separately implemented in each EB component.

The CRB may make a CT-request to the CTM for every cell of each packet. However, the decision made on the SOP cell of a packet is the final decision for the packet as a whole and the CTM should respond with the same decision for every cell of that packet. Regardless of whether the decision is for CT or for SAF, every cell can be written to the ingress buffer without knowing the CT decision. The control information that is necessary to pass to the EB component with the CT data cells may travel with each data cell (or may be sent on the CT control path with the ingress buffer address). Since the write-to-read delay of CT cells through the ingress buffer is a fixed number of cycles, any control information only needs to be delayed by the same number of cycles and may not be stored in the ingress buffer.

Figure 14:
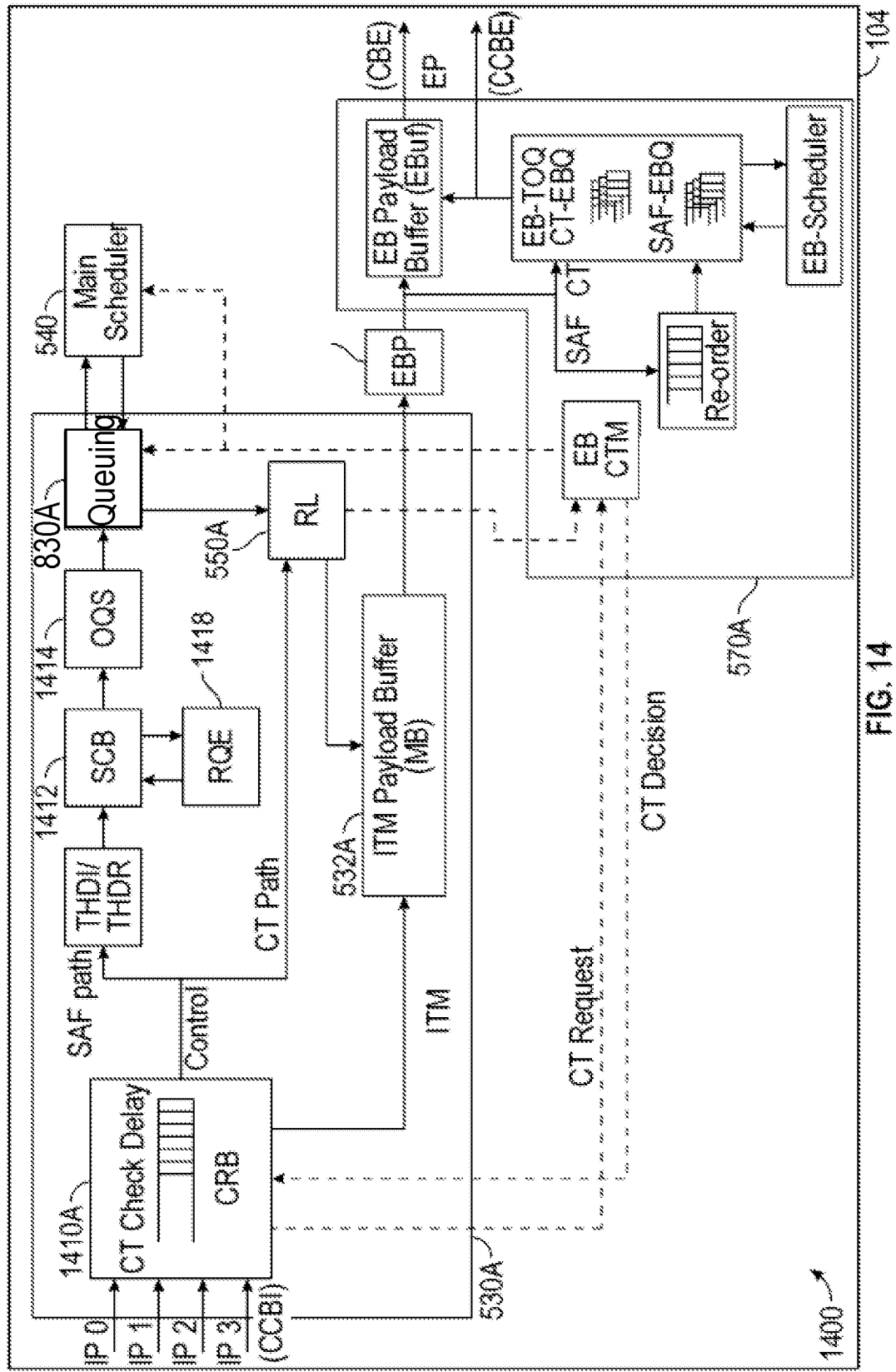
FIG. 14 is an example diagram illustrating a cut-through state machine for a network switch, in accordance with one or more implementations.

Each EB-CTM contains a CT state machine for every output port. FIG. 14 is an example diagram 1400 illustrating a CT state machine for a network switch (e.g., network switch 104), in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 14, in the CT state, the packets to the output port are on the CT path, and thus are forwarded from the CRB directly to the RL 550A of the ITM 530A, bypassing the thresholding component (THDI/THDR), the source context block 1412, the OQS block 1414, and the Queueing block 830A. On the other hand, in the SAF state, the packets to the output port are on the SAF path, and thus pass through the thresholding component (THDI/THDR), the source context block 1412, the OQS block 1414, and the Queueing block 830A, to reach the RL 550A. The CTM 1460 of the EB component 570A may be involved with determining whether to transition to the CT state from the SAF state. Although not shown in FIG. 14, additional EB components (e.g., EB components 570B-570H) for the ITM 530A may exist within the network switch 104 and may have respective CTMs that have the similar features to the CTM 1460. As discussed above, when a packet arrives through the input ports, it is held in the CRB 1410A, and the CRB 1410A sends a CT request to the CTM 1460 of the EB component 570A to request to place the output port to the CT state and thus take the CT path. If the CTM determines to place the output port to the CT state, then the CTM 1460 may return the CT decision with such an indication, and the packet held in the CRB 1410A will take the CT path. Otherwise, the output port will be in the SAF state, and the packet held in the CRB 1410A may take the SAF path.

In the CT state, all packets to the output port are on the CT path, and any newly arriving packets may be on the CT path as long as all CT conditions are met. While in the CT state, if a newly arriving packet cannot be granted CT access (e.g., thus cannot be on the CT path), the traffic manager may transition from the CT state to a CT-Reject state. The CT-Reject state is a temporary state in which all CT packets that previously arrived are drained from the ingress buffer and the EB component. When all CT packets have been drained, the output port transitions to the SAF state.

In the SAF state, all packets to the output port are on the SAF path, and any newly arriving packets may be on the SAF path as long as the output port is backlogged. When the output port becomes completely empty, the output port may transition from the SAF state directly to the CT state upon the next packet arrival. When the output port becomes almost empty but not completely empty, the output port may transition to the TCT state for the next packet.

In the TCT state, newly arriving packets take the CT path to the EB component. Further, in the TCT state, SAF packets still in the MMU are sent to the EP before any packet from the CT path is allowed to be drained from the EB component. When all the SAF packets are drained from the EB, the port can then move to the CT state. On the contrary, if conditions change and a newly arriving packet should be sent to the SAF path, then the transition to CT has failed, and the port moves into the TCT-Fail state.

In the TCT-Fail state, newly arriving packets take the SAF path. Further, in the TCT-Fail state, the MMU may contain packets from three different periods: pre-TCT SAF packets from the SAF state, TCT CT packets in the TCT state, and post-TCT SAF packets after transitioning out of the TCT state. The packets from each period may be sent completely to the EP/port before packets of the next period (e.g., on a per-port basis or on a per-EB-Group basis). When all pre-TCT SAF packets and all TCT CT packets have been drained from the EB, then the port is allowed to move back to the SAF state and all post-TCT SAF packets in the MMU from that point on are just considered SAF packets, and the regular TOQ queues will keep them in order.

In order for the CTM to grant a CT-request, the state machine for the output port should be in CT or TCT state and pass a number of checks to remain in CT state. The basic check is that the CT-FIFO size (the total number of cells in the CT EB-Queues) for the output port remains below a programmed threshold. If the number of CT cells in the EB component grows too large for a port, then that port should move to the SAF state to prevent the EB from overflowing.

The conditions for granting the CT-request are as follows, one or more of which may be implemented in any given implementation. Destination ports (output ports) and source ports (input ports) are CT-enabled. The number of CT cells in EB-Queues for the output port is below the accept threshold. Packets (SOP cells) are marked as CT-eligible from the input ports. The packet type is unicast. Source and destination port conditions satisfy, with no slow source port to fast destination port, and no CT to/from CPU, loopback, or maintenance ports. A single source port is used at a time. No "interleaving" of CT cells from different source ports to a single output port. PFC check satisfies (e.g., where any PFC asserted will cause all packets to go through the SAF path). All shapers associated with the output port are in-profile. If any shaper is out-of-profile, new packets are delayed via the SAF path). EB enqueue bandwidth may not be oversubscribed (EB level checks). No more than two cells per cycle are allowed into the EB component. CTM should allow for SAF traffic bandwidth by limiting CT acceptance when other ports associated with the EB components are actively sending SAF packets. ITM (e.g., ingress buffer) bandwidth may not be oversubscribed (e.g., indicated from the RL).

Cut-through cells are granted the highest priority in the RL. For example, the RL fills in additional SAF ingress buffer reads up to the maximum of six reads per cycle. The RL also maintains a maximum rate of two cell reads per cycle for any one EB component. The CT cells cannot be delayed by the RL, so there may, in fact, be up to 8 CT cells reads in any one cycle for a single EB component across both RLs of two ITMs, for example. This rate may not be sustainable, but the EB protection may be able to support a burst at this full rate. However, the burst length is limited by the EB-CTM acceptance checks.

The RL also monitors ITM congestion and tells the CTM to deny all CT when the RL determines that either the ITM (e.g., ingress buffer) is oversubscribed or that the SAF packets are not getting their fair share of ingress buffer read bandwidth. To determine when the ingress buffer is oversubscribed, the RL makes two measurements to infer these conditions: the depth of each individual RL-EBQ and the average number of reads actually performed over a given time period.

The overall rate of reads per ITM should be 4 per-cycle (per-ITM) to maintain a cell per-cycle to each EB component. The RL and ingress buffer support up to 6 cell reads per cycle, so if the rate of cell reads is over 4 for a significant period of time, the RL interprets this to mean that the ingress buffer is oversubscribed and through a signal to the CTM, will block all new CT requests.

The RL maintains a RL-EBQ on a per-EB basis. Each RL-EBQ is a FIFO of ingress buffer read requests for SAF cells destined to one EB/EPipe. If a RL-EBQ backs up for a period of time, the RL uses this as an indication that the SAF traffic that makes up these requests is being held back from meeting its fair share of ingress buffer bandwidth relative to the active CT traffic. Thus, if any RL-EBQ's depth is greater than a programmable threshold for a given time period, then the RL may prevent any new CT packets to all ports from being accepted via the CTM.

The EBP absorbs bursts of data cells. In particular, the EBP may absorb bursts of data cells (up to 8 per cycles) destined to a single EB component which can only handle two cells per cycle at its input. As mentioned above, while the RL moderates the SAF read requests down to two per cycle over a very short window, the CT cells may burst at a rate up to 8 cells per cycle into the EBP (one from each IP pipeline). The duration of this burst is limited by the number of ports in a single output EP pipeline since each output port may only have a single input port granted CT at any one time and some accumulation time is required between cells from a single input port. The EB-CTM further limits the size of these bursts by enforcing a maximum bandwidth allowance for all CT and SAF traffic. The size of the burst may be complicated by the presence of the OBM buffer at the head of the IPipe that can, when backlogged, supply cells to the IP and MMU at the minimum cell spacing, faster than the actual line rate. To moderate this effect and limit the size necessary of the EBP cell storage, CT-eligible cells from the OBM may add additional inter-cell spacing to MOP and EOP cells based on the speed of the port. SOP cells can always be scheduled by the IDB port scheduler with minimum port cell spacing since the MMU, specifically the EB-CTM, is able to reject an SOP cell for CT when bandwidth limits are exceeded. When the OBM becomes backlogged and it is desirable to drain the OBM as quickly as possible using minimum cell spacing for all types of cells, then packets out of the OBM can no longer be CT eligible and should be marked for "no-cut-through" to the MMU.

CT cells destined for a given output port should be put into a separate EB-Queue from the SAF packets. These queues were previously known as the "CT-FIFO." For a normal operation, a single CT EB-Queue (or CT-FIFO) per output port would be sufficient. However, multiple CT EB-Queues are needed to allow for PFC flow control to stop the flow of packets for specific priorities while allowing other priorities to continue. For this reason, the EB component may maintain a CT EB-Queue for every "PFC-optimized" class of service just as it does for every SAF class of service. Each EB-Group may contain a SAF EB-Queue and a CT EB-Queue.

Separating the CT packets from SAF packets by using separate EB-Queues in the EB component may be necessary to maintain packet order from input port to output port. When changing from the CT state to the SAF state, it is possible for the first SAF packets to reach the EB component before the last cells of a long CT packet that was previously granted the CT path. The EB component should hold onto these SAF packets until all CT packets are complete before allowing the SAF packets to proceed to the EP. Likewise, when the state changes from the SAF state to the CT state, the first CT cells can arrive at the EB component before all the previously enqueued SAF packets are even read from the ingress buffer.

The EB-scheduler can determine if the CT or SAF EB-Queues of each EB-Group should be allowed to be transmitted to the EP based on the CT and PFC state of the port. If we consider just two states, CT and SAF, when the port changes to SAF state from CT state, the CT EB-Queues should be drained completely before allowing SAF packets from EB-Queues of the same EB-Group to be drained, and vise-versa. The EB-CTM and EB-Scheduler of the EB component should work together to schedule from the correct set of EB-Queues, either SAF or CT.

The EB CTM of the EB component is the main CT control block in the subject disclosure. There may be one CTM within every EB component and they work independently of each other. The functions of the EB CTM may include all of the following for its port: CT/SAF decision for every packet/cell, tracking the number of SAF and CT cells on each path in the MMU, tracking the total CT bandwidth allocated to prevent granting too much CT bandwidth within any one EPipe, maintaining the per-port CT state machines, interface with ToQ and main scheduler for Transition-CT, tracking CT EB-Queue lengths and Transition buffer occupancy, and tracking the PFC state for all priorities (PFC inhibits CT).

Transitioning into the TCT state is a speculative transition attempt from the SAF state to the CT state. Such an approach allows newly arrived packets to follow CT path before all SAF packets have been transmitted. Parameters to determine whether to enter the TCT state may be tuned to optimize the probability of successful transitions from the SAF state to the CT states. Thus, the degree of speculation may be configurable.

To determine whether to transition from the SAF state to the CT state, the MMU keeps track of the number of cells and packets present in the SAF path for each output port. A programmable threshold for the number of packets and the number of cells may be used as an indication that an output port may soon become empty. If all packets are small, single-cell packets, then only the number of cells may be tracked and a threshold equal to the enqueue-dequeue-delay may be sufficient to determine when to attempt the transition to CT. However, for large packets, the accumulation time of a large packet may be greater than the enqueue-dequeue delay and therefore the larger number of cells are considered. In the case of a large packet, it may be sufficient to wait until only one packet is present in the output queue, but it is necessary to not only look for a small number of packets present (1 or 2), but also count the number of cells to judge a partial packet size as the cut-off. The EB CT Manager may check the number of packets and the number of cells present in the SAF path of the ITM and the EB component before allowing a port to attempt a state change to TCT.

Due to the differences in the number of cells and packets present in the MMU between small and large packets, especially at the slower port speeds, a threshold check that is programmed to account for both large and small packets should be used. The preferred threshold check is:

$$\text{OK for transition} = (\text{\#cells} < \text{cellthreshold1}) \text{ or } ((\text{\#cells} < \text{cellthreshold2}) \text{ and } (\text{\#pkts} < \text{pktthreshold})) \quad (1)$$

Cellthreshold1 is based on the number of small cells (e.g., 64B packet) that can be present in steady state purely due to the enqueue-dequeue delay. Pktthreshold and Cellthreshold2 are based on the number of packets and cells present in steady state due to packet re-assembly plus enqueue-dequeue delay for large packets (e.g., 5 kB-9 kB packets). Pktthreshold should be very small (in range of 2-5). Cellthreshold2 should be programmed approximately with 1.1-1.5 times the number of cells in a jumbo packet (e.g., 9 kB).

Equation 1 above may be simplified to the following equation.

$$\text{OK for transition} = (\text{\#pkts} < \text{pktthreshold}) \text{ and } (\text{\#cells} < \text{cellthreshold2}) \quad (2)$$

Packet threshold is based on the number of cells (also packets) present for small packets (e.g., 64B in size). This pktthreshold would be equal to the cellthreshold1 of the first equation. Cellthreshold2 is based on the cells present for 1+ packets of 9 kB (max size) packets which should be the same or larger than pktthreshold.

One way to achieve smoother, easier transition from the SAF state to the CT state in the output port is additional buffering in the EB component. Forwarding transition packets to the CT control path before the SAF path is empty means that the first CT packets may arrive in the EB component before the SAF path drains completely and may be held in the EB component until all SAF packets that arrived previously can be drained from the MMU before allowing the first CT packet to proceed to the EP. The extra buffering may be referred to as the "transition buffer space." If the delay through the SAF path may be expected to be longer, this transition buffer is also set to be correspondingly larger.

Physically, the transition buffer can be a part of the EB buffer included in the EB component, and there is a dedicated number of cells in the EB component. To mitigate this cost, only a single port at a time per pipeline may be allowed to enter the transition state (e.g., TCT state) and may use the transition buffer space. Once a output port enters the transition state, all newly arriving packets for that output port will follow the CT path as long as the port does not revert to SAF state. All packets sent to the CT path are stored, in order, in the transition buffer, and are queued in the EB's CT queues. Allowing one port to transition from SAF to CT at a time should be sufficient for good CT performance and resiliency.

Once in the TCT state, there are two phases the output port will go through in order to progress to the CT state. Phase 1 is waiting for all SAF packets to be drained from the port. Phase 2 is draining any backlogged packets from the transition buffer. During Phase 1, the transition buffer will accumulate CT packets and grow in size since this is the main buffering point for CT packets. Once all the SAF packets have been completely drained from the ITM and EB, the port enters Phase 2, and the EB component then transmits packets from the CT queues for that port.

Once the transition buffer is drained and the number of CT cells present in the EB component is under the CT maximum threshold minus some hysteresis offset (a programmable value), the output port is allowed to move to the CT state and the transition buffer is then available for another port within its pipeline to also attempt the CT transition.

It is expected that packets may continue to arrive for the output port while it is draining the transition buffer. In one or more implementations, in the worst case the arrival rate may be at or above the drain rate (the output port speed) and the transition buffer never drains completely. If this happens, the port may abort the transition to CT.

The following are additional details on reverting back to the SAF state after determining to transition to the CT state. Traffic conditions on the input port or output port may change at any time and may become worse during the time a port is in the transition state. If this occurs, then the port should be able to gracefully abort the transition to the CT state and revert back to SAF state.

While in the TCT state, the transition buffer cannot be allowed to be overfull. Thus, for example, if the buffer fill level grows beyond a programmable threshold, the port then reverts back to SAF state. In addition, for fairness to other ports within the same pipeline, the port in the TCT state cannot be allowed to monopolize the transition buffer, where such monopolization may prevent other ports from transitioning from the SAF state to the CT state. This could easily be possible if the input rate changes suddenly to match the drain rate and the transition buffer size stays at the same size. Therefore, a second check to monitor whether the available space of the transition buffer is decreasing over time is needed. If the total size of the CT queues does not decrease over time, then the port may revert back to the SAF state. Leaving the TCT state and moving to the TCT fail state may force all newly arriving packets into the SAF path and therefore may allow the transition buffer to drain such that the transition buffer may then become available for other ports to use.

When a port enters the TCT state and then reverts back to the SAF state, there may be packets simultaneously present in the MMU from three separate time periods for that output port, including pre-TCT state SAF packets (from the pre-TCT period), TCT state CT Packets (from the TCT period), and post-TCT state SAF packets (from the post-TCT period). Packets for each time period are sent completely before allowing packets from the next time period to keep packets in order, which may be implemented on a per-port basis or on a more fine-grain per EB-Group basis. In particular, the EB component may have two sets of queues for each port, such as SAF queues and CT queues, and can distinguish the TCT state CT packets of the TCT period from SAF packets of the pre-TCT period or the post-TCT period. To help the EB component separate SAF packets from the pre-TCT period and the post-TCT period, it is not allowed for the EB component to have both pre-TCT state SAF packets and Post-TCT state SAF packets present in a single SAF EB-Queue at the same time. The TOQ block maintains one extra set of port queues on a per-pipe basis so that when a port enters TCT, any post-TCT state SAF packets can be queued separately from the pre-TCT state SAF packets. The EB-CTM maintains counts of the number of packets present in the MMU for all three periods, and can therefore determine when the EB component can switch from the SAF queues to the CT queues and then back to the SAF queues. This is possible because the TOQ and main scheduler do not allow any post-TCT state SAF packets to be scheduled prior to the last pre-TCT state SAF packet being sent to the EP.

One or more of the following conditions may need to satisfy to transition from the CT state to the TCT state. The TCT buffer space in an EB component should be enough for one port per transition at a time (per EB). Thresholds on TCT-buffer which influence the CTM state transition and CT acceptance decisions should be satisfied. Thresholds on the number of SAF cells and packets present in the MMU to attempt TCT should be satisfied. CTM should maintain separate counts of packets for pre-TCT state SAF packets, TCT state CT packets, and post-TCT SAF packets. For example, counters should be implementing on per-port basis. For example, counters should be implementing (per-port, per-EB-Group) basis.

In one or more implementations, coordination with the SAF path may be necessary. Every SAF cell may be marked as "pre-TCT" or "post-TCT" by the CTM before entering the SAF enqueue path. The TOQ should be able to hold post-TCT state SAF packets in a separate set of queues until allowed to activate them by the CTM after all pre-TCT state SAF packets have arrived in the EB component. The main scheduler does not need to know about the TCT state or the difference between pre-TCT state SAF and post-TCT state SAF packets, but needs to delay scheduling post-TCT state SAF packets until enabled by the EB-CTM. Coordination between the EB CT Manager and the SAF path is accomplished with signals between the EB CTM and the main scheduler and TOQ blocks.

Because the EB buffer may only receive up to two cells per cycle, a burst of cells to any one EB component will be absorbed in the ITM or EB-Protection blocks. Large bursts of SAF packets may be held in the ITM buffer. However, bursts of CT cells flow through the ITM and may be delayed in the EB-Protection buffering before being sent to the EB component. This creates a larger EBP size requirement to handle CT flows from all eight input pipelines simultaneously. To prevent the EBP from overflowing, the rate of cells from the input port is moderated by the OBM for CT-eligible packets. The input port scheduler inserts a number of cycles for all MOP and EOP cells to approximate the rate of cells actually arriving from the line. When the OBM becomes full, the input port scheduler reduces this inter-cell delay to the minimum cell-to-cell spacing allowed by the input port and MMU (2 cycles), but then also may mark the packets for "no cut-through" in the MMU. The no-cut-through signal is set to arrive at the MMU on the CCBI control bus for each packet and every cell of those packets.

Part of the control bus to from MMU to EP (CCBE) includes the packet length. However, for CT packets, the full packet length is not known for all packets until the EOP cell. The EP is to make updates to meters and other counters when processing the EOP cell rather than the SOP cell. In one or more implementations, the EP, specifically the EDatabuf at the end of the pipeline, may be required to hold one or more cells before starting transmission of any packet to the Port Macro (PM). This is to compensate for jitter between cells from the MMU to the EP within a packet and prevent any under-run condition on the port interface. The exact number of cells depends on design implementation of the MMU and the EB component and the specific port speed. A calculation is published separately to program the EP start count on a port speed basis.

Previously, a Port Pause is not supported at the same time as CT for an output port. According to some aspects of the subject disclosure, while there may not be a direct interface of a Port Pause indication to the MMU, the Port Pause indication may manifest as a port in the EB component not being able to drain any packets due to the EB component running out of EP (EDataBuf) cell credits. In such aspects, the CT EB-Queues may naturally fill and reach the threshold that forces the port into CT-FAIL and eventually SAF state. This is handled automatically as a regular part of the CT decision in the EB-CTM.

According to some aspects of the disclosure, the CT EB-Queues can stop scheduling packets on a packet boundary (e.g., in a similar manner as the SAF EB-Queues do) without overflowing the EBuf. This makes the optimized PFC response time consistent regardless of whether the port is in the SAF state or the CT state at the time PFC-XOFF is asserted. Allowing the EB component to respond to PFC-XOFF while in CT state requires the EB design to implement a CT EB-Queue for each EB-Group (e.g., the same number (9) as is needed for SAF packets). This allows packets with a priority level that is in the PFC-XON state to not be blocked by packets with the PFC-XOFF priority. Note that asserting any level of PFC will force the port to move to the SAF state. The CT/SAF state is on a per-port basis and not a per-priority basis. When PFC-XOFF is asserted, it means that at least for one priority level, the port should be in the SAF state to buffer packets before allowing them to be sent at a later time when PFC-XON is re-asserted.

A packet order may be maintained on every packet flow between input port and output port pairs. When transitioning between the CT state and the SAF state, the packet order should be maintained. When some packets take the CT path to an output port while other packets may take the SAF path to the same output port, the order of the packets through an input port should be maintained in the output port so that the packets egress in the same order as the packets ingress. For example, later arriving packets taking the CT path to the output port cannot be allowed to exit the switch before earlier packets taking the SAF path. Later arriving TCT packets may arrive at the output port before all previously queued SAF packets can arrive at the output port. Then, the TCT packets are buffered and delayed at the output port until all SAF packets are transmitted out of the traffic manager via the output port. Therefore, a small buffer may be implemented at each output port to hold TCT packets. When all SAF packets have been drained, then the CT path is allowed to become active and the port can then transition to CT state.

The following example shows maintaining the packet order during the transition from the CT state to the SAF state. When an output port becomes congested, newly arriving packets follow the SAF path and the output port changes from CT state to SAF state. All packets that previously arrived and are following the CT path may be transmitted to the output port before the first SAF packet is allowed to be transmitted. The following example shows maintaining the packet order during a transition from the SAF state to the CT state. The output queues for a port may not need to be completely empty before allowing a transition from the SAF state to the CT state (e.g., via the TCT state). When SAF queues are empty or almost empty, newly arriving packets are allowed to start taking the CT path. However, packets are transmitted in arrival order between any input/output port pair and all previously arrived SAF packets should be transmitted before allowing the CT packets to be transmitted to the EP.

The SAF path through the traffic manager is as follows. When packets arrive into an ITM from ingress packet processing, packet data (in cells) is immediately stored in the main packet buffer (e.g., ITM payload buffer). Packet Control information is held in a cell receive block (CRB) while an egress cut-through manager (EB-CTM) determines whether packet data will take the CT path or the SAF path for the packet data.

If it is determined that the packet data take the SAF path, then pointers to the packet data are passed to the SAF path. In one or more implementations, the SAF path will include THDI, the source context block, the OQS block, the TOQ/THDO block, and the main scheduler. The packet should be admitted into the buffer (THDI and THDO), and should then be queued into the output queues for the output port. Subsequently, the packet should be scheduled by the main scheduler for transmission to the output port.

If it is determined that the packet data take the CT path, then pointers to the packet data are passed to the RL. The RL immediately passes the data cell pointers to the Main payload buffer to be read and forwarded to the EB component. The packet data on the CT path bypass the admission control, Queueing, and scheduling that packets on the SAF path goes though. When the packet data on the CT path arrives at the EB, the packet data is queued separately from SAF packets in the EB component. The SAF and CT paths converge again in the EB component. The EB scheduler is responsible for maintain the correct packet ordering between packets on the SAF path and CT path. CT packets are send to out of the TM as soon as possible by the EB component while maintaining correct packet ordering.

TCT packets also take the CT path through the Traffic Manager. TCT packets may be held longer in the EB component than regular CT packets to allow for the transition from SAF to occur.

Figure 15:
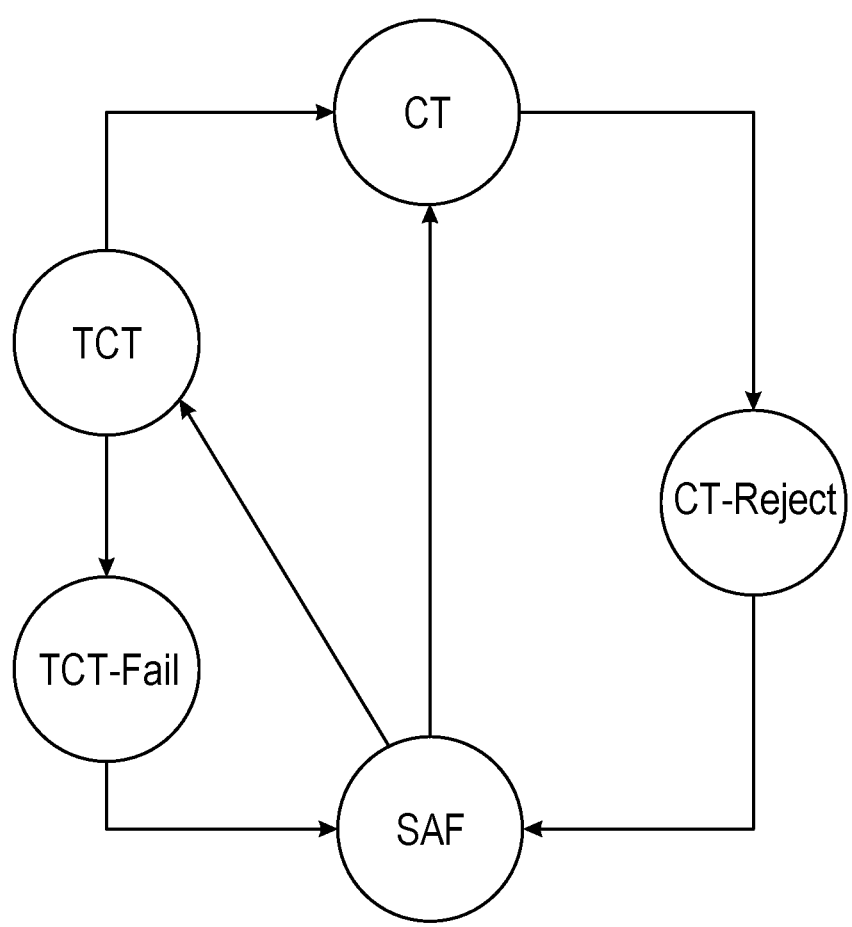
FIG. 15 is an example diagram illustrating the store-and-forward path in a traffic manager, in accordance with one or more implementations.

FIG. 15 is an example diagram 1500 illustrating the SAF path and the CT path in a traffic manager, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As illustrated in the diagram, the EB-CTM in the ITM may determine whether packet data from the input ports will take the CT path or the SAF path for the packet. If it is determined that the packet data take the SAF path, then pointers to the packet data are passed to the SAF path, which includes THDI/THDR, the source context block, the OQS block, the TOQ/THDO block, and the main scheduler, before reaching the RL. On the other hand, if it is determined that the packet data take the CT path, then pointers to the packet data are passed to the RL.

For a regular unicast CT, a CT packet flow may follow the following simple CT packet flow path while in the CT state. At step 1, a SOP cell arrives from IP to the CRB. At step 2, the CRB sends a CT Request to the EB CTM of the EB component associated with the packet's output port, and holds the cell in the CT Check Delay FIFO. Independently, the CFAP generates the ingress buffer cell address (not shown). At step 3, the EB-CTM responds with the CT decision back to the CRB. At step 4, the CRB sends the ingress buffer cell address for this CT cell (CT-CA) directly to the RL. At step 5, the RL may, in one or more implementations, always select CT-CA with higher priority than SAF-CAs and sends CT-CA to the MB. At step 6, the ingress buffer reads cell data and sends it to the EBP. At step 7, the EBP puts CT data cell through its own FIFOs and then sends along the CT cell to EB component. At step 8, while cell data is written into the EBuf, the EB-CA is enqueued into the CT EB-Queues. At step 9, the CT EB-Queue is activated into the EB scheduler. At step 10, the EB-Scheduler schedules the CT cell. At step 11, the EB-TOQ sends the EB-CA to EBuf to read the cell data. At step 12, cell data and cell control information are sent to the EP on the CBE and the CCBE, respectively.

While newly arriving packets pass the CT acceptance check, they continue to follow the simple CT packet flow path described above. However, when CT conditions are not met, the EB-CTM does not grant CT access to a requesting packet, and the port will transition from the CT state to the CT-Fail state, then finally to the SAF state. The following steps may be followed for unicast packet when the transition happens from the CT state to the CT-reject state and then to the SAF state.

At step 1, a SOP cell arrives from IP to the CRB. At step 2, the CRB sends "CT Request" to the EB CTM of the packet's output port, and holds the cell in the "CT Check Delay". At step 3, the EB-CTM cut-through check fails and responds with the CT decision of "SAF" to the CRB. EB-CTM also asserts "disable port scheduling" to the Main scheduler while the CT cells are still on the way to the EB component. The main scheduler may not send the SAF cells to the EB component until the EB cell credits are updated in the Main scheduler after all CT cells are received so that the port's reservation in EBuf does not overflow. The port state changes from the CT state to the CT-Fail state. Any previously granted CT cells (even newly arriving cells of the final previously incomplete CT packet) continue on the CT path to the EB component.

At step 4, the CRB sends new SAF packets to the SAF enqueue path (THDI→SCB→OQS→TOQ/THDO). At step 5, the TOQ activates its SAF queues into the main scheduler. At step 6, when the last CT cell is received into the EB component (based on EB-CTM cell counters), the EB-CTM updates the EB cell credits to the main scheduler and removes the "disable port scheduling" signal. SAF packets are now allowed to be scheduled out of the ITM to the EB component. At step 7, both the CT and the SAF packets may be present in the EB component. The EB component continues to schedule CT EB-Queues until all CT packets are transmitted. At step 8, the port moves to the SAF state and the EB-QS schedules packets from the SAF EB-Queues to the EP.

When a new packet arrives while the port is in SAF state, but conditions are good for a transition to CT, the port may move from SAF state to the TCT state, and may respond to the CT request with a positive CT response. In this case, steps 1-9 of the simple CT packet flow described above may be used and additional steps may be inserted between steps 9 and 10. When the CT cell is stored in the EBuf and queued in CT EB-Queues, there may be previous SAF packets in either the ITM ingress buffer or the EBuf/EBQs or both. Between steps 9 and 10 of the simple CT packet flow, the EB-Scheduler continues to schedule SAF EB-Queues (ignoring CT EB-Queues) while the SAF data is present in the ingress buffer or the EBuf, and after last "Pre-TCT SAF" packet is scheduled by the EB-Scheduler (based on CTM counters), the CTM informs the EB-Scheduler to select from the CT EB-Queues. The EB-CTM's state advances from the TCT state to the CT state.

The CT transition may be unsuccessful after transitioning to the SAF state. Thus, the transition may be from the SAF state to the TCT state, and then back to the STF state. Steps 1-9 of the simple CT packet flow described above may be used, and different steps may be inserted after step 9 of the CT packet flow, as described below.

At step 10, the EB-Scheduler continues to schedule the SAF EB-Queues (ignoring CT EB-Queues) while SAF data is present in the ingress buffer or the EBuf. At step 11, a packet arrives and the conditions dictate that new packets may take the SAF path. The CTM state moves to the TCT-Fail. The new CT request fails (CT decision is "SAF"), and a control flag is flipped so that all newly arriving SAF packets are marked as "Post-TCT SAF".

At step 12, the Post-TCT SAF packets are queued in the TOQ in the "extra" set of port queues and not activated into the Main Scheduler. At step 13, the Main scheduler continues to schedule packets from the "Pre-TCT SAF" queues. The EB-Scheduler continues to schedule from the SAF EB-Queues. TCT packets wait in the EBuf and CT EB-Queues. Any newly asserted PFC-XOFF is masked from the Main scheduler so that all the pre-TCT SAF packets are able to drain to the EB component.

At step 14, when the last Pre-TCT SAF cell data arrives in the EB, the EB CTM signals to the main scheduler to "disable port scheduling" and signals the TOQ to activate the post-TCT SAF queues into the main scheduler. (PFC-XOFF is no longer masked to the Main scheduler). The main scheduler should disable scheduling post-TCT SAF until all CT cells are received in the EB component so that the EB cell credits can be adjusted in the main scheduler before scheduling any post-TCT SAF cells. The EB-Scheduler continues to schedule from the SAF EB-Queues until all pre-TCT SAF packets have been transmitted.

At step 15, the EB-Scheduler now schedules packets from the CT EB-Queues (draining the Transition buffer space). When the last CT cell is received into the EB, the EB-CTM removes the "disable port scheduling" signal from main scheduler, and post-TCT SAF packets are now allowed to be scheduled out of the ITM to the EB component. When enough CT packets are drained, the transition buffer is freed to be used by any other port that may need to use it.

At step 16, when all packets are drained from the CT path for this port, the CTM transitions to the SAF state. At step 17, the EB-Scheduler now schedules packets from the SAF EB-Queues.

When a Unicast+Mirror/CTC packet arrives from the IP, the Unicast copy of the packet may take the CT path at the same time that the Mirror or Copy-to-CPU copy takes the SAF path (including RQE). The initial "CT Request" from the CRB is only for the Unicast copy. Each copy out of the RQE also makes a "dummy CT request" to the CTM, which may always be denied.

The Unicast CT copy may take the regular CT control path (e.g., can either take the simple CT path or can utilize the TCT control mechanisms) while the additional copies should go through the entire SAF path. The SAF path may involve passing through the thresholding component (THDI/THDR), a source context block, an OQS block, a ToQ block, a main scheduler, back to the ToQ block, and then to an RL so that the packets may be forwarded to the EB protection block and the EB component to be output to the EP. The copy count may be used to track the total number of copies made with the Unicast CT copy as just one of them. The CCP and CFAP should allow for the CT and SAF copies to be sent out of the MMU in any order and only release the ingress buffer cells to the free list after all copies have been transmitted to the EP.

FIGS. 16-20 illustrate a flow diagram of example processes 1600-2000 of traffic flow management within a network switch in accordance with one or more implementations. For explanatory purposes, the processes 1600-2000 are primarily described herein with reference to the network switch 104 of FIGS. 1-2. However, the processes 1600-2000 are not limited to the network switch 104, and one or more blocks (or operations) of the processes 1600-2000 may be performed by one or more other components of the network switch 104. Further for explanatory purposes, the blocks of the processes 1600-2000 are described herein as occurring in serial, or linearly. However, multiple blocks of the processes 1600-2000 may occur in parallel. In addition, the blocks of the processes 1600-2000 need not be performed in the order shown and/or one or more of the blocks of the processes 1600-2000 need not be performed and/or can be replaced by other operations.

Figure 16:
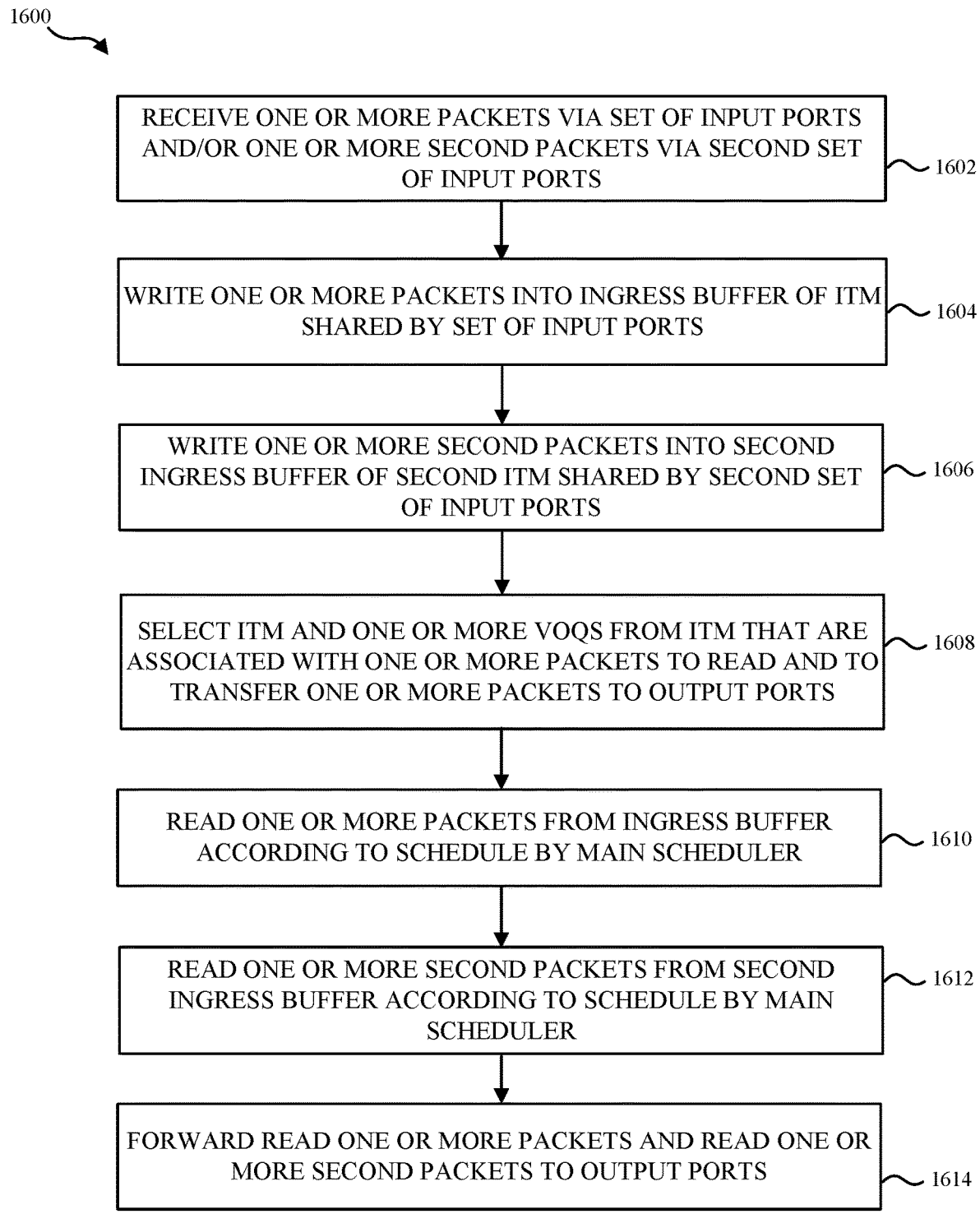
FIG. 16 illustrates a flow diagram of an example process of traffic flow management within a network switch in accordance with one or more implementations.

FIG. 16 illustrates a flow diagram of an example process 1600 of traffic flow management within a network switch in accordance with one or more implementations. Each block in the process 1600 may be performed by one or more of an ingress controller 538A of an ingress tile (e.g., ITM 530A), a second ingress controller 538B of a second ingress tile (e.g., second ITM 530B), or a scheduling controller of the main scheduler 540 of the network switch 104. In the process 1600, the ingress controller 538A receives one or more packets via a set of input ports 520A-D and/or the second ingress controller 538B receives one or more second packets via a second set of input ports 520E-H (1602).

The ingress controller 538A writes the one or more packets into an ingress buffer 532A of the ITM 530A shared by the set of input ports 520A-D (1604). In some aspects, where the one or more packets are divided into cells, the ingress controller 538A may write the one or more packets into the ingress buffer 532A by receiving the cells of the one or more packets via the set of input ports 520A-D. In some aspects, the ingress controller 538A may write the one or more packets into the ingress buffer 532A further by writing the cell control to one or more output accumulation FIFOs of an OQS block 1414 of the ITM 530A. In some aspects, the ingress controller 538A may write the one or more packets into the ingress buffer 532A further by: reading the cells from the one or more output accumulation FIFOs, generating one or more VoQs based on the cells from the one or more output accumulation FIFOs, and distributing the one or more VoQs to one or more VoQ banks of a Queueing block 830A of the ITM 530A. The second ingress controller 538B writes the one or more second packets into a second ingress buffer 532B of the second ITM 530B shared by the second set of input ports 520E-H (1606).

The scheduling controller 542 of the main scheduler 540 may select the ITM 530A and one or more VoQs from the ITM 530A that are associated with the one or more packets to read and to transfer the one or more packets to the output ports 580A-H (1608). The ingress controller 538A reads the one or more packets from the ingress buffer 532A according to a schedule by the main scheduler 540 (1610). The ingress controller 538A may read the one or more packets from the ingress buffer 532A by: receiving, from the main scheduler 540, a request for one or more dequeues to the Queueing block 830A, reading the cells from the one or more VoQs based on the request for the one or more dequeues, and sending the cells to a read launcher 550A. The second ingress controller 538B reads the one or more second packets from the second ingress buffer 532B according to the schedule by the main scheduler 540 (1612). The ingress controller 538A forwards the read one or more packets and/or one or more second packets to the output ports 580A-H (1614).

Figure 17:
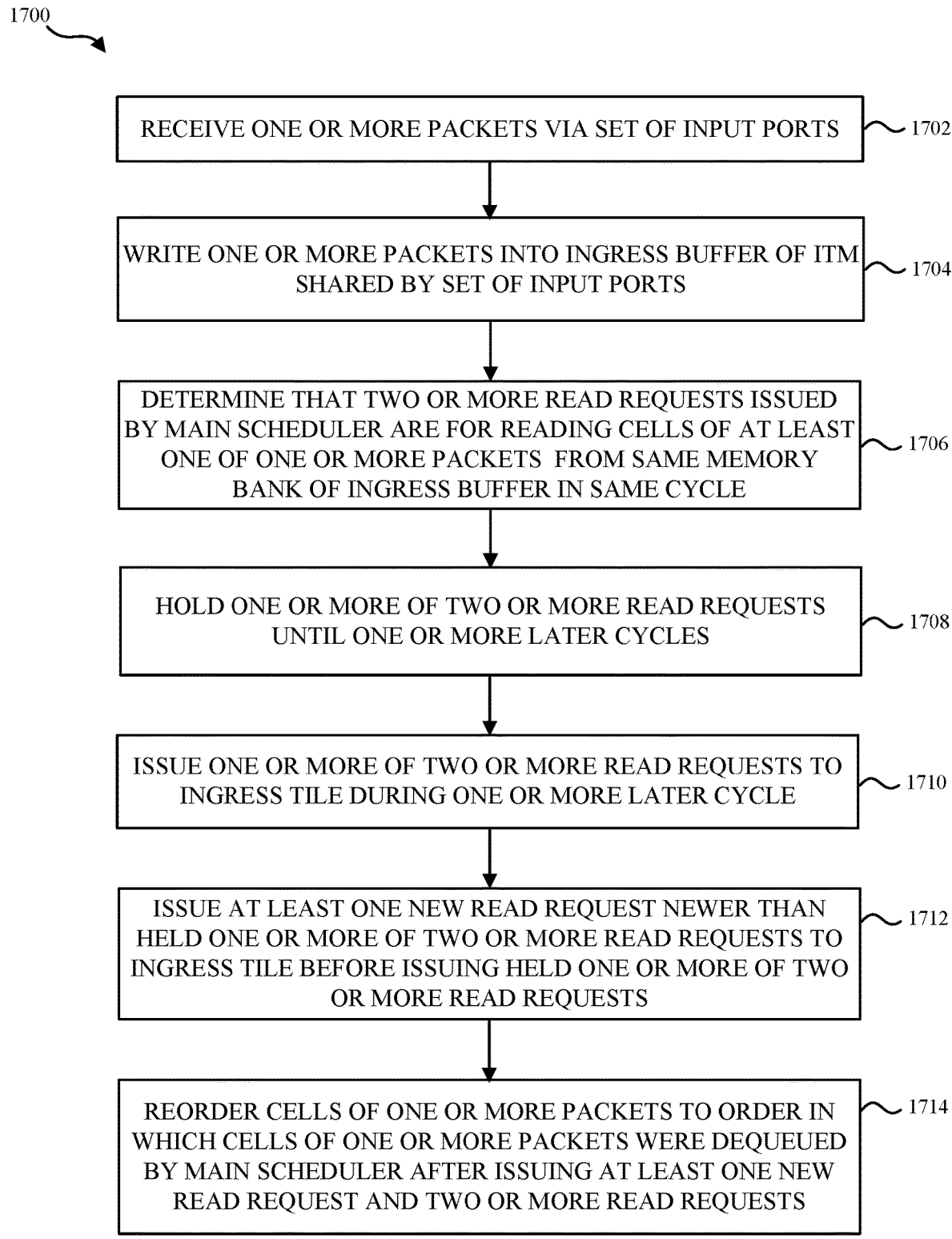
FIG. 17 illustrates a flow diagram of an example process of traffic flow management within a network switch in accordance with one or more implementations.

FIG. 17 illustrates a flow diagram of an example process 1700 of traffic flow management within a network switch in accordance with one or more implementations. In this example each payload memory bank can execute one read per clock cycle. In other implementations a payload memory bank may support higher reads per clock. Each block in the process 1700 may be performed by an ingress controller 538A of the ITM 530A or an egress controller 572A of the EB component 570A or the main scheduler 540 of the network switch 104.

In the process 1700, the ingress controller 538A receives one or more packets via a set of input ports 520A-D (1702). The ingress controller 538A writes the one or more packets into an ingress buffer of an ITM 530A shared by the set of input ports 520A-D (1704). The ingress controller 538A determines that two or more read requests issued by the main scheduler 540 are for reading cells of at least one of the one or more packets from a same memory bank of the ingress buffer in a same cycle (1706). The ingress controller 538A holds one or more of the two or more read requests until one or more later cycles (1708). The ingress controller 538A issues the one or more of the two or more read requests to the ITM 530A during the one or more later cycles (1710). The ingress controller 538A issues at least one new read request newer than the held two or more read requests to the ITM 530A before issuing the held one or more of the two or more read requests that are in collision with each other (1712). The egress controller 572A reorders cells of the one or more packets to an order in which the cells of the one or more packets were dequeued by the main scheduler 540 after issuing the at least one new read request and the two or more read requests (1714).

Figure 18:
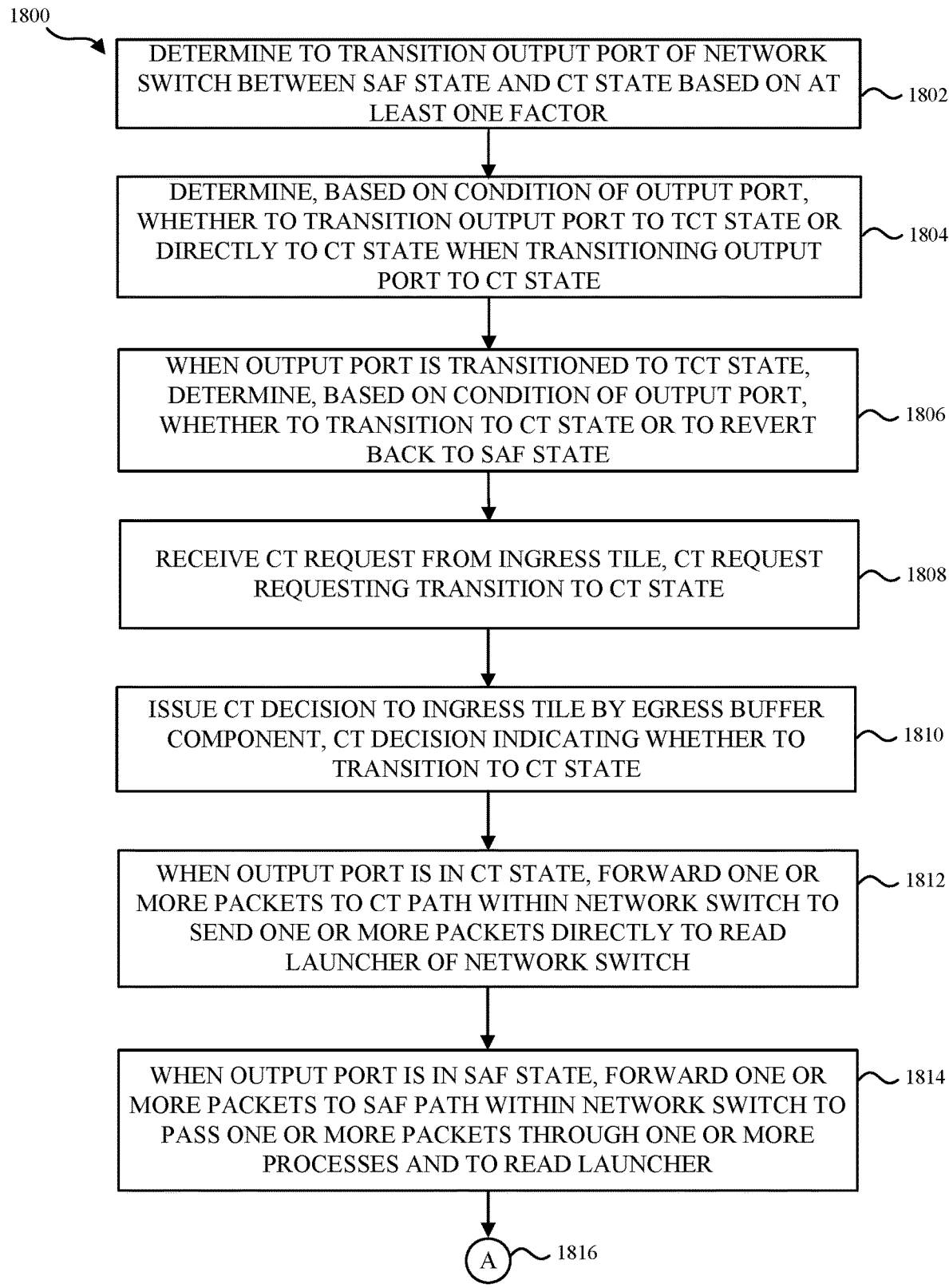
FIG. 18 illustrates a flow diagram of an example process of traffic flow management within a network switch in accordance with one or more implementations.

FIG. 18 illustrates a flow diagram of an example process 1800 of traffic flow management within a network switch in accordance with one or more implementations. Each block in the process 1800 may be performed by an ingress controller 538A of the ITM 530A or an egress controller 572A of the EB component 570A associated with the output port 580A of the network switch 104. In the process 1800, the egress controller 572A determines to transition the output port 580A of the network switch 104 from an SAF state to a CT state based on at least one factor (1802). The egress controller 572A determines, based on a condition of the output port, whether to transition the output port to a TCT state or directly to a CT state when transitioning the output port to the CT state (1804). The egress controller 572A, when the output port is transitioned to the TCT state, determines, based on the condition of the output port, whether to transition the output port to the CT state or to transition the output port back to the SAF state (1806).

The egress controller 572A receives a CT request from an ingress tile, the CT request requesting a transition to the CT state (1808). The egress controller 572A issues a CT decision to the ingress tile via the egress buffer component, the CT decision indicating whether to transition the output port to the CT state (1810). In some aspects, a packet that arrived at the ingress tile may be held from processing until the CT decision is returned.

The ingress controller 538A, when the output port 580A is in the CT state, forwards one or more packets to a CT path within the network switch 104 to send the one or more packets directly to a read launcher of the network switch (1812). The ingress controller 538A, when the output port 580A is in the SAF state, forwards the one or more packets to an SAF path within the network switch 104 to pass the one or more packets through one or more processes and to the read launcher (1814). At 1816, additional features may be performed, as described below.

Figure 19:
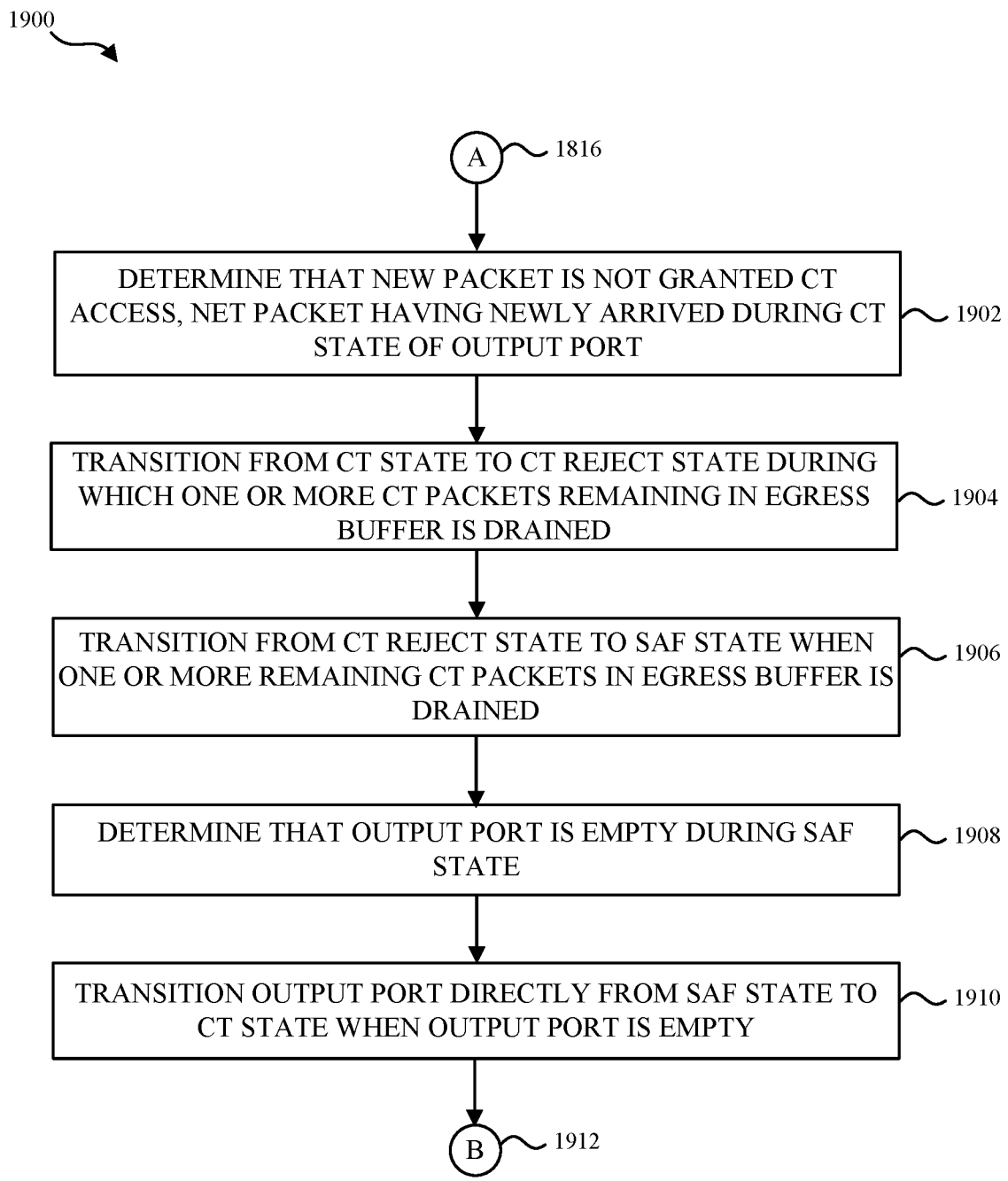
FIG. 19 illustrates a flow diagram of an example process of traffic flow management within a network switch in accordance with one or more implementations, continuing from the example process of FIG. 18.

FIG. 19 illustrates a flow diagram of an example process 1900 of traffic flow management within a network switch in accordance with one or more implementations, continuing from the example process 1800 of FIG. 18. Each block in the process 1900 may be performed by an egress controller 572A of the EB component 570A of the network switch 104. In the process 1900, the network switch 104 may continue from 1814 of FIG. 18. The egress controller 572A may determine that a new packet is not granted CT access, the new packet having newly arrived during the CT state of the output port 580A (1902). The egress controller 572A may transition the output port 580A from the CT state to the CT reject state during which one or more CT packets remaining in an egress buffer are drained, the CT packets having been received at the egress buffer via a CT path within the network switch during the CT state of the output port (1904). The egress controller 572A may transition the output port 580A from the CT reject state to the SAF state when the one or more remaining CT packets in the egress buffer are drained (1906).

The egress controller 572A may determine that the output port 580A is empty during the SAF state (1908). The egress controller 572A may transition the output port 580A directly from the SAF state to the CT state when the output port 580A is empty (1910). At 1912, additional features may be performed, as described below.

Figure 20:
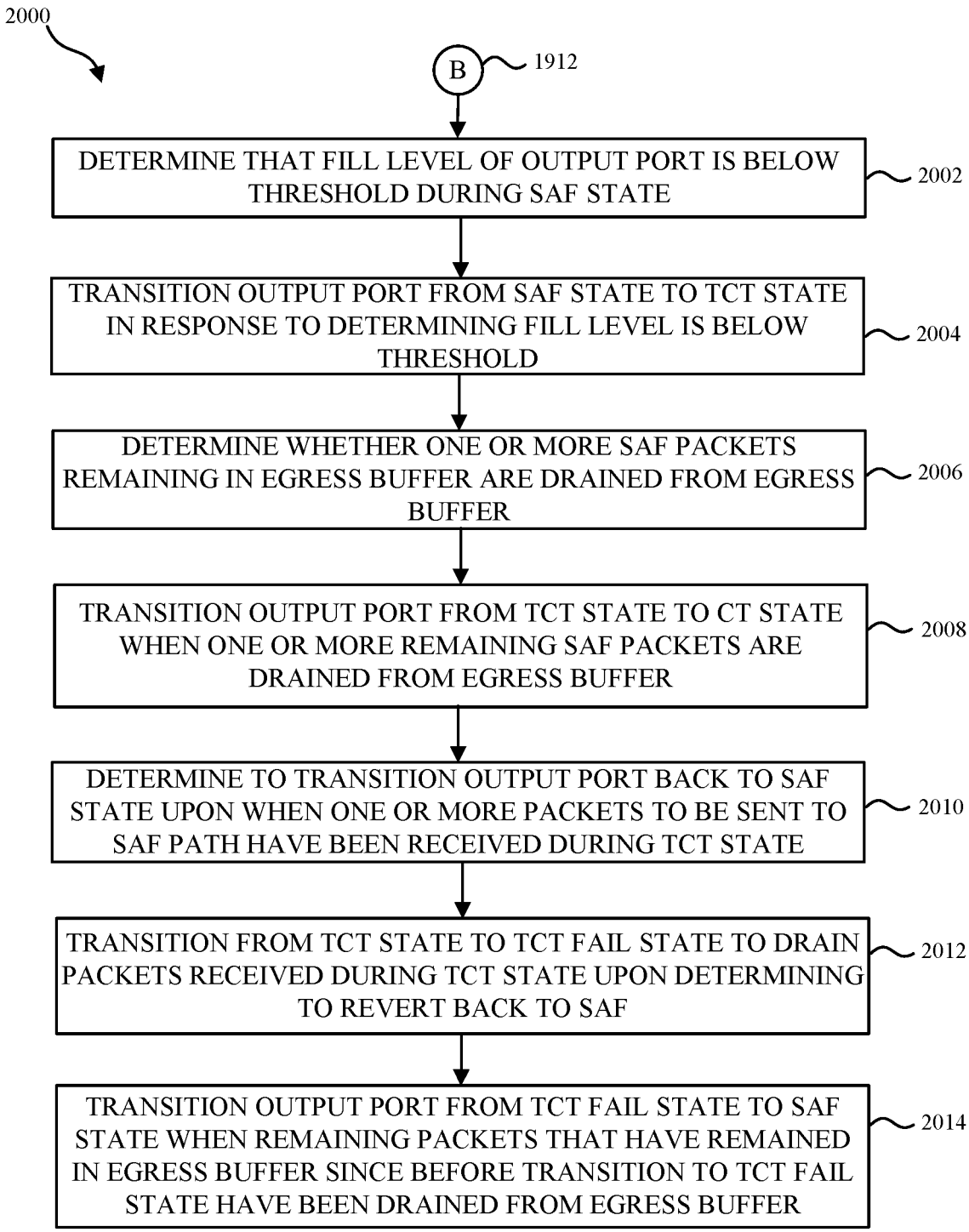
FIG. 20 illustrates a flow diagram of an example process of traffic flow management within a network switch in accordance with one or more implementations, continuing from the example process of FIG. 19.

FIG. 20 illustrates a flow diagram of an example process 2000 of traffic flow management within a network switch in accordance with one or more implementations, continuing from the example process 2000 of FIG. 20. Each block in the process 2000 may be performed by an egress controller 572A of the EB component 570A of the network switch 104. In process 2000, the network switch 104 may continue from 1912 of FIG. 19. The egress controller 572A may determine that a fill level of the output port 580A is below a threshold during the SAF state (2002). The egress controller 572A may transition the output port from the SAF state to the TCT state in response to determining that the fill level is below the threshold (2004).

The egress controller 572A may determine whether one or more SAF packets remaining in an egress buffer are drained from the egress buffer, the SAF packets having been received the egress buffer via an SAF path within the network switch during the SAF state of the output port 580A (2006). The egress controller 572A may transition the output port 580A from the TCT state to the CT state when the one or more remaining SAF packets are drained from the egress buffer (2008). In one or more implementations, the egress controller 572A may determine to transition the output port 580A back to the SAF state when one or more packets to be sent to an SAF path within the network switch 104 have been received during the TCT state (2010). In one or more implementations, the egress controller 572A may transition the output port 580A from the TCT state to the TCT fail state to drain packets received during the TCT state upon determining to transition the output port 580A back to the SAF state (2012). The egress controller 572A may transition the output port 580A from the TCT fail state to the SAF state when remaining packets that have remained in the egress buffer since before the transition to the TCT fail state have been drained from the egress buffer (2014).

Figure 21:
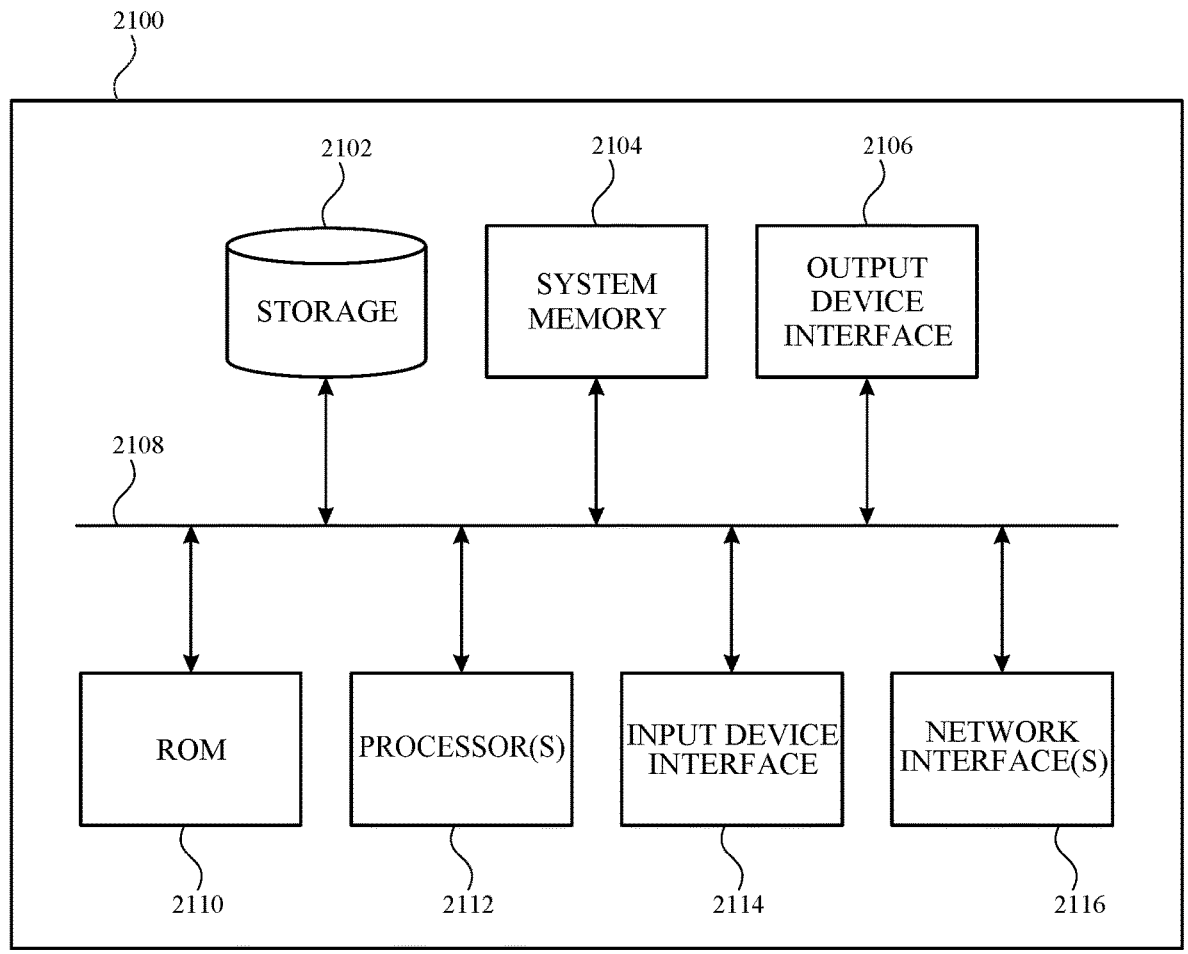
FIG. 21 illustrates an example electronic system with which aspects of the subject technology may be implemented in accordance with one or more implementations.

FIG. 21 illustrates an electronic system 2100 with which one or more implementations of the subject technology may be implemented. The electronic system 2100 can be, and/or can be a part of, the network switch 104 shown in FIG. 1. The electronic system 2100 may include various types of computer readable media and interfaces for various other types of computer readable media. The electronic system 2100 includes a bus 2108, one or more processing unit(s) 2112, a system memory 2104 (and/or buffer), a ROM 2110, a permanent storage device 2102, an input device interface 2114, an output device interface 2106, and one or more network interfaces 2116, or subsets and variations thereof.

The bus 2108 collectively represents all system, peripheral, and chipset buses that communicatively connect the numerous internal devices of the electronic system 2100. In one or more implementations, the bus 2108 communicatively connects the one or more processing unit(s) 2112 with the ROM 2110, the system memory 2104, and the permanent storage device 2102. From these various memory units, the one or more processing unit(s) 2112 retrieves instructions to execute and data to process in order to execute the processes of the subject disclosure. The one or more processing unit(s) 2112 can be a single processor or a multi-core processor in different implementations.

The ROM 2110 stores static data and instructions that are needed by the one or more processing unit(s) 2112 and other modules of the electronic system 2100. The permanent storage device 2102, on the other hand, may be a read-and-write memory device. The permanent storage device 2102 may be a non-volatile memory unit that stores instructions and data even when the electronic system 2100 is off. In one or more implementations, a mass-storage device (such as a magnetic or optical disk and its corresponding disk drive) may be used as the permanent storage device 2102.

In one or more implementations, a removable storage device (such as a floppy disk, flash drive, and its corresponding disk drive) may be used as the permanent storage device 2102. Like the permanent storage device 2102, the system memory 2104 may be a read-and-write memory device. However, unlike the permanent storage device 2102, the system memory 2104 may be a volatile read-and-write memory, such as random access memory. The system memory 2104 may store any of the instructions and data that one or more processing unit(s) 2112 may need at runtime. In one or more implementations, the processes of the subject disclosure are stored in the system memory 2104, the permanent storage device 2102, and/or the ROM 2110. From these various memory units, the one or more processing unit(s) 2112 retrieves instructions to execute and data to process in order to execute the processes of one or more implementations.

The bus 2108 also connects to the input and output device interfaces 2114 and 2106. The input device interface 2114 enables a user to communicate information and select commands to the electronic system 2100. Input devices that may be used with the input device interface 2114 may include, for example, alphanumeric keyboards and pointing devices (also called "cursor control devices"). The output device interface 2106 may enable, for example, the display of images generated by electronic system 2100. Output devices that may be used with the output device interface 2106 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 21, the bus 2108 also couples the electronic system 2100 to one or more networks and/or to one or more network nodes, through the one or more network interface(s) 2116. In this manner, the electronic system 2100 can be a part of a network of computers (such as a LAN, a wide area network ("WAN"), or an Intranet, or a network of networks, such as the Internet. Any or all components of the electronic system 2100 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A network switch, comprising:
    at least one ingress controller configured to:
        receive one or more packets via a set of input ports;
        write the one or more packets into an ingress buffer of an ingress tile shared by the set of input ports, the ingress buffer comprising memory banks;
        read the one or more packets from the ingress buffer based on a schedule of read requests issued by a scheduler, the scheduler being external to the ingress tile; and
        forward the read one or more packets to a plurality of output ports; and
    a read launcher connected to the at least one ingress controller and separate from the scheduler, the read launcher configured to:
        determine that multiple of the read requests issued by the scheduler are for reading cells from a same memory bank of the ingress buffer in a same cycle; and
        hold one or more of the multiple read requests from the at least one ingress controller until one or more later cycles.

2. The network switch of claim 1, comprising:
    at least one second ingress controller configured to:
        receive one or more second packets via a second set of input ports;
        write the one or more second packets into a second ingress buffer of a second ingress tile shared by the second set of input ports;
        read the one or more second packets from the second ingress buffer according to the schedule by the scheduler; and
        forward the read one or more second packets to the plurality of output ports.

3. The network switch of claim 2, wherein the schedule is set based on at least one of a quality of service (QoS) requirement or bandwidth availability across the ingress buffer and the second ingress buffer.

4. The network switch of claim 1, further comprising:
    at least one scheduling controller of the scheduler, the at least one scheduling controller configured to:
        select the ingress tile and one or more virtual output queues (VoQs) from the ingress tile that are associated the one or more packets to read and to transfer the one or more packets to the plurality of output ports.

5. The network switch of claim 1, wherein the one or more packets are divided into a plurality of cells, and wherein the at least one ingress controller is further configured to:
    receive the plurality of cells of the one or more packets into one or more output accumulation FIFOs.

6. The network switch of claim 5, wherein the one or more output accumulation FIFOs are of an orthogonal queue set (OQS) block of the ingress tile.

7. The network switch of claim 6, wherein the at least one ingress controller is further configured to:
    read the plurality of cells from the one or more output accumulation FIFOs;
    generate one or more multi-packet and/or multi-cell enqueues to virtual output queues (VoQs) based on the plurality of cells from the one or more output accumulation FIFOs; and
    distribute the one or more VoQs enqueues to one or more VoQ banks of a Queueing block of the ingress tile.

8. The network switch of claim 7, wherein the at least one ingress controller is further configured to:
    receive, from the scheduler, a request for one or more dequeues of the Queueing block;
    read the plurality of cells as multi-packet and/or multi-cell dequeues from the one or more VoQs based on the request for the one or more dequeues; and
    send the plurality of cells to a read launcher.

9. The network switch of claim 1, wherein the at least one read launcher is further configured to:
    issue the one or more of the multiple read requests to the ingress tile during the one or more later cycles.

10. The network switch of claim 9, wherein the at least one read launcher is further configured to:
    issue at least one new read request newer than the held one or more of the multiple read requests to the ingress tile before issuing the held one or more of the multiple read requests.

11. The network switch of claim 10, further comprising:
at least one egress buffer configured to:
reorder cells of the one or more packets to an order in which the cells of the one or more packets were dequeued by the scheduler after issuing the at least one new read request and the multiple read requests.

12. A network switch, comprising:
a plurality of input ports;
a plurality of ingress tiles respectively including a plurality of ingress buffers, each ingress tile of the plurality of ingress tiles being shared by a respective set of input ports of the plurality of input ports, and each of the plurality of ingress buffers comprising a plurality of memory banks;
a scheduler connected to the plurality of ingress tiles to schedule communication of data by the plurality of ingress tiles, the data being located in any of the plurality of memory banks of any of the plurality of buffers;
a read launcher connected to one of the plurality of ingress tiles, the read launcher being separate from the scheduler and the read launcher being configured to:
determine that multiple read requests issued by the scheduler for the one of the plurality of ingress tiles are for reading cells from a same memory bank of the plurality of memory banks of the one of the plurality of ingress tiles in a same cycle;
hold the one or more of the multiple read requests until one or more later cycles; and
issue the one or more of the multiple read requests to the one of the plurality of ingress tiles during the one or more later cycles;
a plurality of egress buffers coupled to the plurality of ingress tiles to receive data from the plurality of ingress tiles; and
a plurality of output ports respectively coupled to the plurality of egress buffers, wherein each output port of the plurality of output ports is coupled to a respective egress buffer of the plurality of egress buffers.

13. The network switch of claim 12, further comprising:
a mesh interconnect coupling the plurality of ingress tiles to the plurality of egress buffers.

14. The network switch of claim 12, wherein the scheduler is configured to schedule communication of data based on at least one of a quality of service (QoS) requirement or bandwidth availability across the ingress buffers of the plurality of ingress tiles.

15. The network switch of claim 12, wherein each of the plurality of egress buffers is configured to reorder cells of data packets to an order in which the cells of the data packets were dequeued by the scheduler.

16. The network switch of claim 12, wherein the plurality of memory banks of each respective ingress buffer of the plurality of ingress buffers are configured to operate in parallel with one another.

17. A network switch, comprising:
at least ingress controller configured to:
receive one or more packets via a set of input ports;
write the one or more packets into an ingress buffer of an ingress tile shared by the set of input ports, the ingress buffer comprising a plurality of memory banks; and
read the one or more packets from the ingress buffer based on a schedule of read requests issued by a scheduler, the scheduler being external to the ingress tile; and
a read launcher connected to the at least one ingress controller and separate from the scheduler, the read launcher being configured to:
determine that multiple read requests issued by the scheduler are for reading cells of at least one of the one or more packets from a same memory bank of the plurality of memory banks of the ingress buffer in a same cycle;
hold one or more of the multiple read requests from the at least one ingress controller until one or more later cycles when a number of the multiple read requests is greater than N; and
issue the one or more of the multiple read requests to the at least one ingress controller during the one or more later cycles.

18. The network switch of claim 17, wherein the at least one read launcher is further configured to:
issue at least one new read request newer than the held one or more of the multiple read requests to the ingress tile before issuing the held one or more of the multiple read requests.

19. The network switch of claim 18, further comprising:
at least one egress controller configured to:
reorder cells of the one or more packets to an order in which the cells of the one or more packets were dequeued by the scheduler after issuing the at least one new read request and the multiple read requests.

20. The network switch of claim 17, wherein the plurality of memory banks of the ingress buffer are configured to operate in parallel with one another.

* * * * *